United States Patent [19]
Yamasaki et al.

[11] Patent Number: 5,481,514
[45] Date of Patent: Jan. 2, 1996

[54] RECORDING/REPRODUCING APPARATUS INCLUDING AN AUTO CHANGER FOR A DISK-LIKE RECORDING MEDIUM

[75] Inventors: Hidetoshi Yamasaki, Atsugi; Masae Murata, Yamato; Yukio Noya, Kanagawa; Yasukazu Yomogita, Sagamihara; Manabu Taguchi, Zama; Akira Yamanaka; Naoki Sibuya, both of Yokohama, all of Japan

[73] Assignee: Victor Company of Japan, Ltd., Yokohama, Japan

[21] Appl. No.: 112,371

[22] Filed: Aug. 27, 1993

[30] Foreign Application Priority Data

| Aug. 31, 1992 | [JP] | Japan | 4-255708 |
| Apr. 28, 1993 | [JP] | Japan | 5-103179 |
| Apr. 28, 1993 | [JP] | Japan | 5-103180 |
| May 28, 1993 | [JP] | Japan | 5-127018 |

[51] Int. Cl.⁶ .......................... G11B 17/22; G11B 17/08
[52] U.S. Cl. .................. 369/36; 369/191; 360/98.06
[58] Field of Search .......................... 360/92, 98.01, 360/98.04, 98.05, 98.06; 369/34, 36, 38, 39, 178, 191, 192, 193, 194, 258, 292

[56] References Cited

U.S. PATENT DOCUMENTS

| 4,607,354 | 8/1986 | Ishibashi et al. | 369/39 |
| 4,614,474 | 9/1986 | Sudo | 414/281 |
| 4,722,078 | 1/1988 | Nakanishi et al. | 369/39 |
| 4,827,463 | 5/1989 | Motoyoshi et al. | 369/36 |
| 4,974,102 | 11/1990 | Hamachi et al. | 360/92 |
| 5,046,059 | 9/1991 | Yoshida et al. | 369/36 |
| 5,058,090 | 10/1991 | Ueno et al. | 369/36 |
| 5,280,463 | 1/1994 | Okajima et al. | 369/36 |
| 5,289,441 | 2/1994 | Domberg et al. | 369/34 |
| 5,303,214 | 4/1994 | Kulakowski et al. | 369/34 |

FOREIGN PATENT DOCUMENTS

| 4-10266 | 1/1992 | Japan | 360/92 |
| 426461 | 3/1992 | Japan . | |
| 474349 | 3/1992 | Japan . | |

*Primary Examiner*—Stuart S. Levy
*Assistant Examiner*—William J. Klimowicz
*Attorney, Agent, or Firm*—Lowe, Price, Leblanc & Becker

[57] ABSTRACT

An auto player technique is provided in a recording/reproducing apparatus storing a plurality of disks, wherein size of the apparatus can be reduced in height and width and positioning accuracy can be increased. A pair of tray stockers are disposed right and left. A lifter transporting the tray in a vertical direction is disposed behind the tray stockers. The lifter includes a tray extracting mechanism selectively extracting disks from the tray stockers. The tray extracting mechanism simultaneously engages with two trays disposed at the same height of the right and left tray stockers when extracting trays. A recording/reproducing device is disposed below the lifter. A drive mechanism engages with the recording/reproducing device to shift it in a right and left direction. A lock mechanism is provided to engage with the recording/reproducing device when the drive mechanism is disengaged from the recording/reproducing device.

20 Claims, 23 Drawing Sheets

RECORDING/REPRODUCING APPARATUS INCLUDING AN AUTO CHANGER FOR A DISK-LIKE RECORDING MEDIUM

BACKGROUND OF THE INVENTION

1. Field of the Invention

The present invention relates generally to a recording/reproducing apparatus including an auto changer for a disk-like recording medium such as a compact disk, and more particularly to a recording/reproducing apparatus including an auto changer which provides a single record/reproduce means commonly used among a plurality of tray stockers, thereby constituting the recording/reproducing apparatus compact, light, simple, and cheaper.

2. Description of the Prior Art

As disclosed in Unexamined Japanese Utility Model Application No. 4-26461/1992, there is already proposed a reproducing apparatus which stores a plurality of disks and reproduces these disks selectively and successively. Also, disclosed in Unexamined Japanese Patent Application No. 4-74349/1992 is a reproducing apparatus equipped with a rotary disk stocker. FIGS. 1, 2(A), 2(B), and 3 show schematic constructions of these prior arts.

FIG. 1 shows a conventional apparatus using an insertion-type magazine. As shown by alternate long and short dash lines in the drawing, a selected disk 601 is placed in a recessed portion on a tray 602. This tray 602 is inserted into a magazine case 603 in a horizontal direction. Thereafter, the magazine case 603 is installed into a reproducing apparatus 604. The reproducing apparatus 604 extracts the selected tray 602 from the magazine case 603 and places the disk 601 in position for reproduction.

A disadvantage of this insertion-type magazine is that the magazine case 603 needs to be pulled out of the reproducing apparatus 604 every time when the disk 601 is exchanged. Furthermore, as the magazine case 603 is detachable from the reproducing apparatus 604, it is feared that the magazine case 603 may be lost.

FIGS. 2(A) and 2(B) show another conventional apparatus using a rotary-type disk stocker. In the drawings, a reproducing apparatus 610 accommodates a tray stocker 612 therein. This tray stocker 612, having multistage guide grooves each storing a tray 611, is hingedly supported by its support shaft so as to cause a horizontal rotation of approximately 90 degrees. As shown in FIG. 2(A), a disk is loaded on the tray 611 and the tray 611 is inserted into the tray stocker 612. Then, as shown in FIG. 2(B), the tray stocker 612 is rotated 90 degrees in a counterclockwise direction. Subsequently, the reproducing apparatus 610 extracts the tray 611 from the tray stocker 612 and places the selected disk in position for reproduction.

This rotary-type tray stocker is disadvantageous in that a rotation mechanism is specially required. Moreover, the tray stocker 612 needs to be rotated every time when the disk is exchanged. Thus, the exchange operation will be time consuming. Frequent rotations imposed on the rotation mechanism will result in a damage of rotation mechanism. If the rotation mechanism is enlarged for reinforcement, it will become impossible to reduce the size of the reproducing apparatus. Still further, if required to increase the number of disks to be stored, the height of the tray stocker 612 needs to be proportionally increased. Accordingly, the size of the reproducing apparatus 610 will be increased more.

FIG. 3 shows a conventional extraction claw used for extracting a tray 602 (or 611) from the magazine case 603 (or tray stocker 612). As shown in FIG. 3, the claw 620 is engaged with a cutout 621 formed at a front or rear end of the tray 602 (611). This conventional claw 620 is inferior in that a bending moment is generated as shown by an arrow 1. If required to improve flexural, it will be required to increase the thickness of this conventional claw 620 much more.

Furthermore, there is proposed an auto player which is provided with a door for closing and opening for operating disks (i.e. trays). The capacity of the tray stocker is so limited that it will be normally difficult to store all the disks (i.e. trays) in the tray stocker. For this reason, it will be necessary to pull out a non-desired disk from the tray stocker to replace it by a desired disk. In such a case, if a reproduction of other disk is not finished yet, it will be necessary to wait the completion of the reproduction of other disk or forcibly interrupt In such a reproducing apparatus there is generally provided a fail-safe mechanism for preventing a disk (i.e. tray) from being mistakenly extracted or inserted, wherein the door is entirely locked to protect the apparatus against a user as long as reproduction of a disk is progressing. If the reproduction is once interrupted by opening the door, it will never resume unless the door is again closed.

Especially, in an auto player equipped with a tray stocker, a disk having been reproduced must be returned to the same guide groove of the tray stocker. Therefore, it is strictly prohibited to open the door during the reproduction so that any other disk (i.e. tray) is not inserted into the empty guide groove which is the original guide groove of the presently reproduced disk.

In general, an auto player capable of performing an automatic reproduction by successively selecting a recording medium such as a compact disk comprises a tray stocker having multistage guide grooves storing numerous disks, a mechanism for recording/reproducing of the disk, and a lifter for receiving and returning a tray from and to the tray stocker and further transporting the disk to the recording/reproducing mechanism.

The transporting movement of the lifter is controlled by a drive mechanism including reduction gears and a timing belt. Although using the reduction gears is advantageous in holding the lifter at a constant height against weight of the lifter, the moving speed of the lifter becomes slow. As a need of expanding the capacity of the tray stocker increases, the height of the tray stocker increases proportionally. Meanwhile, there is an earnest need of shortening an access time. In this respect, using the reduction gears is not suitable for satisfying these needs.

When a disk is transferred between the tray stocker and the lifter, the lifter tends to cause a displacement by receive vibration. Thus, undesirable force may be imparted on the disk or others. In order to solve this kind of problem and realize a high-speed lifter, a conventionally adopted means is a balance mechanism which brings an appropriate balance with respect to the weight of the lifter. This conventional balance mechanism normally requires a guide rail disposed in an up- and-down direction and a deadweight sliding along the guide rail. Such a deadweight, however, increases an overall weight and height of the auto player. Furthermore, a fixing means may be required for preventing the lifter from moving during the insertion and pulling out of the disk. As a result, the apparatus will become complicated more and the production cost will increase correspondingly.

SUMMARY OF THE INVENTION

Accordingly, in view of above problems, an object of the present invention is to provide a recording/reproducing apparatus including an auto changer for a disk-like recording medium which is capable of storing numerous disks and forming the construction compact by reducing its height and width.

Another object of the present invention is to provide a recording/reproducing apparatus including an auto changer for a disk-like recording medium which is capable of storing numerous disks, increasing guide grooves in a tray stocker, realizing a compact construction by disposing a plurality of tray stockers in parallel with each other, and providing a single record/reproduce device for common use among a plurality of tray stockers. Thereby, the production cost can be suppressed within a reasonable range.

Furthermore, another object of the present invention is to provide a recording/reproducing apparatus including an auto changer for a disk-like recording medium which is capable of storing numerous disks and simultaneously extracting a plurality of disks (trays) of the same height by the use of a pair of symmetrically bifurcated extraction claws.

Still further, another object of the present invention is to provide a recording/reproducing apparatus including an auto changer for a disk-like recording medium which is capable of storing numerous disks and quickly completing an access to a disk by the simplified and compacted structure of the lifter.

Yet further, another object of the present invention is to provide a recording/reproducing apparatus including an auto changer for a disk-like recording medium which is capable of storing numerous disks and assuring a highly accurate positioning of a shift mechanism.

Moreover, another object of the present invention is to provide a recording/reproducing apparatus including an auto changer which is capable of allowing a disk (i.e. tray) to be inserted or pulled out even if the recording/reproducing of another disk is not finished yet and detecting opening/closing of the door of a tray stocker by means of a simplified detecting means.

Still further, another object of the present invention is to provide a door opening/closing detecting mechanism for an auto player which is capable of surely detecting the opening/closing of the door of the auto player.

In order to accomplish each of the above objects, a first aspect of the present invention provides a recording/reproducing apparatus including an auto changer for a disk-like recording medium comprising:

a plurality of trays, each accommodating a recording medium such as a compact disk;

at least two tray stockers disposed in parallel with each other, said tray stockers having multistage guide grooves storing said plurality of trays, said guide grooves being configured so as to insert a tray accommodating said recording medium from a front end thereof and extract it from a rear end thereof;

a lifter disposed behind said tray stockers;

a tray extracting mechanism provided on said lifter and having disk clampers of the same number as said tray stockers, said tray extracting mechanism simultaneously engaging with a plurality of trays disposed at the same height of said tray stockers when extracting trays;

said lifter receiving said plurality of trays extracted by said tray extracting mechanism and transporting said plurality of trays vertically downwardly; and record/reproduce means disposed below said lifter for receiving a selected recording medium from said trays and placing it in position for recording/reproducing.

Furthermore, a second aspect of the present invention provides a recording/reproducing apparatus in accordance with the above first aspect, further comprising:

a plurality of doors being provided to close said front end of the tray stockers and being opened in response to a door open command;

record/reproduce division judging means for judging a tray stocker division to which said selected recording medium belongs on the basis of opening of said doors; and door control means for locking a door relating to said tray stocker division and unlocking other door.

Still further, a third aspect of the present invention provides a recording/reproducing apparatus in accordance with the above first aspect, further comprising:

a door provided to close said front end of the tray stockers;

a door locking member for locking and unlocking said door;

a door linkage mechanism linked with said door locking member so as to depart from an locked position in response to an opening of said door;

detecting means for detecting the opening of said door on the basis of a movement of said door linkage mechanism; and record/reproduce control means for prohibiting said record/reproduce means to perform recording/reproducing of said selected recording medium when said door is opened.

Yet further, a fourth aspect of the present invention provides a recording/reproducing apparatus in accordance with the above first aspect, wherein said lifter is associated with a swing arm connected with said lifter through a speed reduction mechanism so as to cause a swing motion in response to a vertical shift motion of said lifter, and said swing arm is urged by a spring against weight of said lifter.

Moreover, a fifth aspect of the present invention provides an auto player comprising:

a plurality Of tray stockers disposed in parallel with each other, said tray stockers having multistage guide grooves storing a plurality of recording mediums;

a lifter serving as a disk changer for selectively extracting a recording medium from said tray stockers and transporting it in a vertical direction;

record/reproduce means disposed below said lifter and being shiftable to a position right below a selected recording medium for receiving and placing it in position for recording/reproducing;

a shift mechanism defined by a rack and a partially geared pinion for shifting said record/reproduce means, said rack being formed on said record/reproduce means, said partially geared pinion being formed thereon with a geared portion meshing with said rack so as to drive said rack in response to a rotation of said partially geared pinion and a non-geared portion disengaging said rack from said partially geared pinion; and a lock mechanism integrally shifting together with said partially geared pinion, said lock mechanism engaging with said record/reproduce means when said rack is disengaged from said partially geared pinion.

Still further, a sixth aspect of the present invention provides a recording/reproducing apparatus including an auto changer for a disk-like recording medium comprising:

a plurality of trays, each accommodating a recording medium such as a compact disk;

a plurality of tray stockers having multistage guide grooves storing said plurality of trays, said guide grooves being configured so as to insert a tray accommodating said recording medium from a front end thereof and extract it from a rear end thereof;

a lifter disposed behind said tray stockers;

a gate provided at the rear end of said tray stocker, said gate preventing said tray from being extracted out of said tray stocker toward said lifter when closed and allowing said tray to be extracted toward said lifter when opened;

a lock member cooperative with said gate to lock said lifter when said gate is opened;

a tray extracting mechanism provided on said lifter and having a plurality of disk clampers, said tray extracting mechanism simultaneously engaging with a plurality of trays disposed at the same height of said tray stockers when extracting trays;

said lifter receiving said plurality of trays extracted by said tray extracting mechanism and transporting said plurality of trays vertically downwardly; and record/reproduce means disposed below said lifter for receiving a selected recording medium from said trays and placing it in position for recording/reproducing.

The above and other objects, features and advantages of the present invention will become more apparent from the following detailed description which is to be read in conjunction with the accompanying drawings.

DETAILED DESCRIPTION OF THE PREFERRED EMBODIMENTS

Hereinafter, with reference to accompanying drawings, preferred embodiments of the present invention will be explained in detail.

FIRST EMBODIMENT

Figure 1:
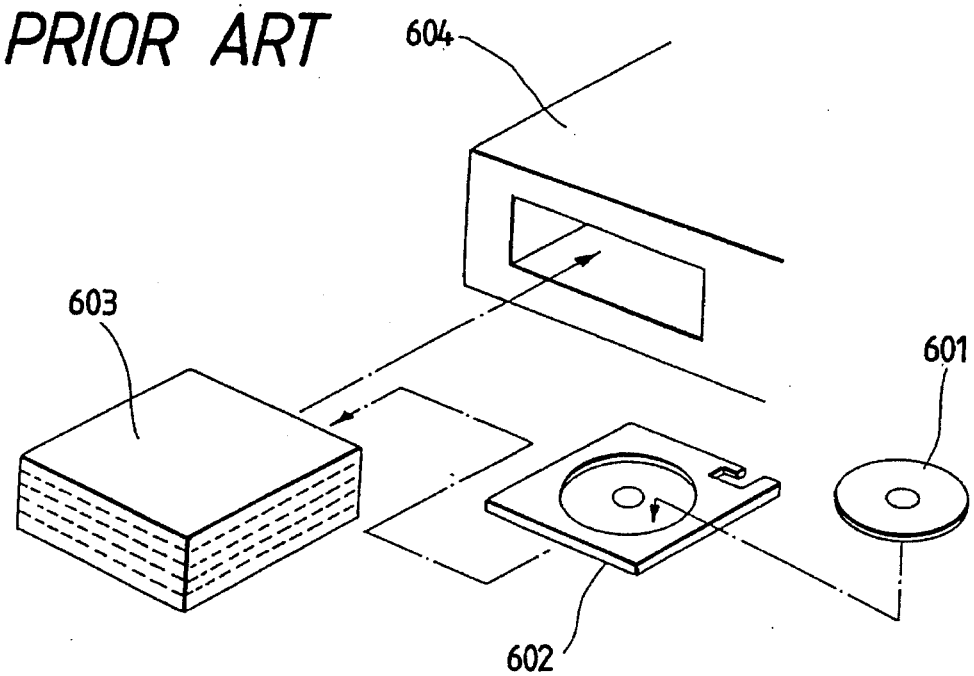
FIG. 1 is a perspective view showing a conventional magazine case.
Figure 2A:
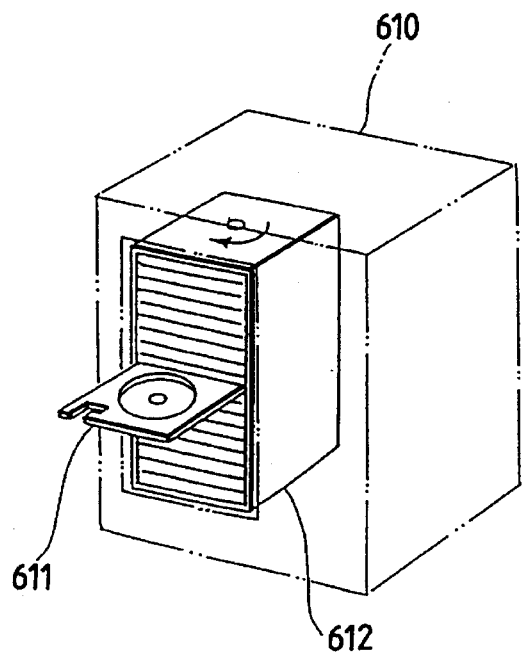
FIGS. 2(A) and 2(B) are perspective views showing a conventional disk tray stocker of a rotary type.
Figure 2B:
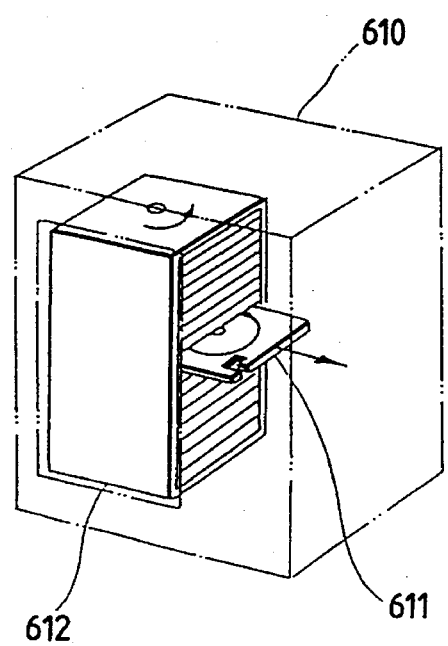
Figure 3:
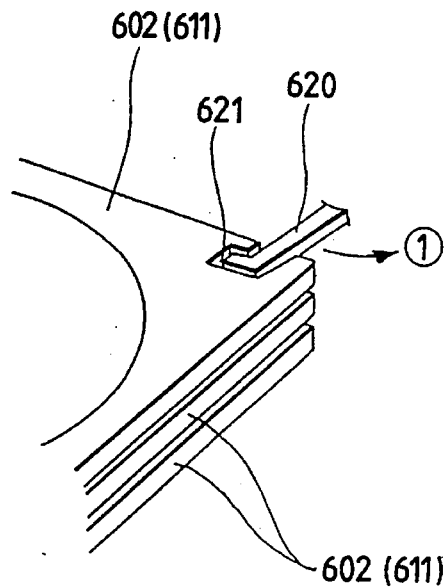
FIG. 3 is a perspective view showing a conventional clamper for extracting a tray.
Figure 4:
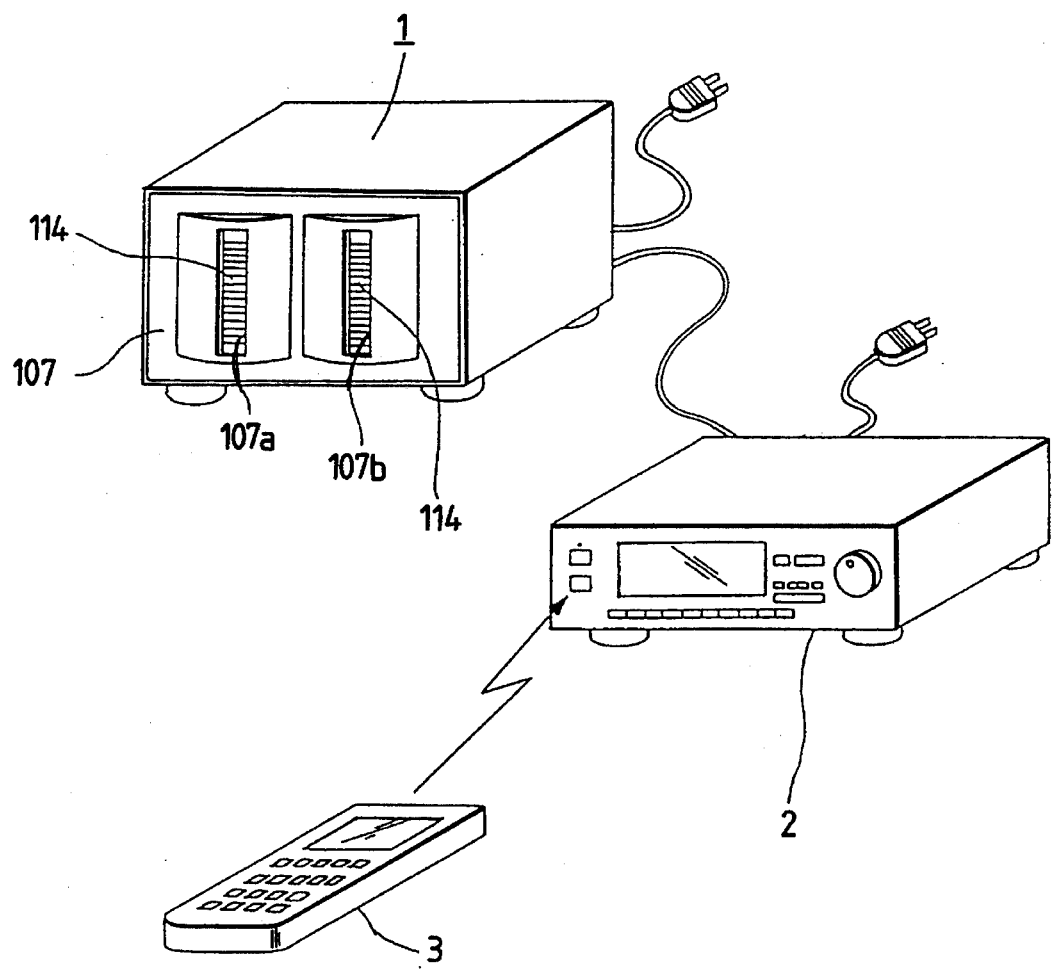
FIG. 4 is a perspective view showing an overall arrangement of a recording/reproducing apparatus including an auto changer for a disk-like recording medium in accordance with the present invention.

FIG. 4 is a perspective view showing an overall arrangement of a recording/reproducing apparatus including an auto changer for a disk-like recording medium in accordance with the present invention. An auto player 1 is associated with a control unit 2 and a remote controller 3. The auto player 1 selects a disk among numerous disks in response to a command supplied from the control unit 2, and performs recording/reproducing operation of the selected disk. Each disk is stored in a tray 114 stocked in the tray stocker of the auto player 1. The auto player 1 has a front end closed by a front door 107 having a pair of windows 107a, 107a shield by a transparent material such as a glass.

Figure 5:
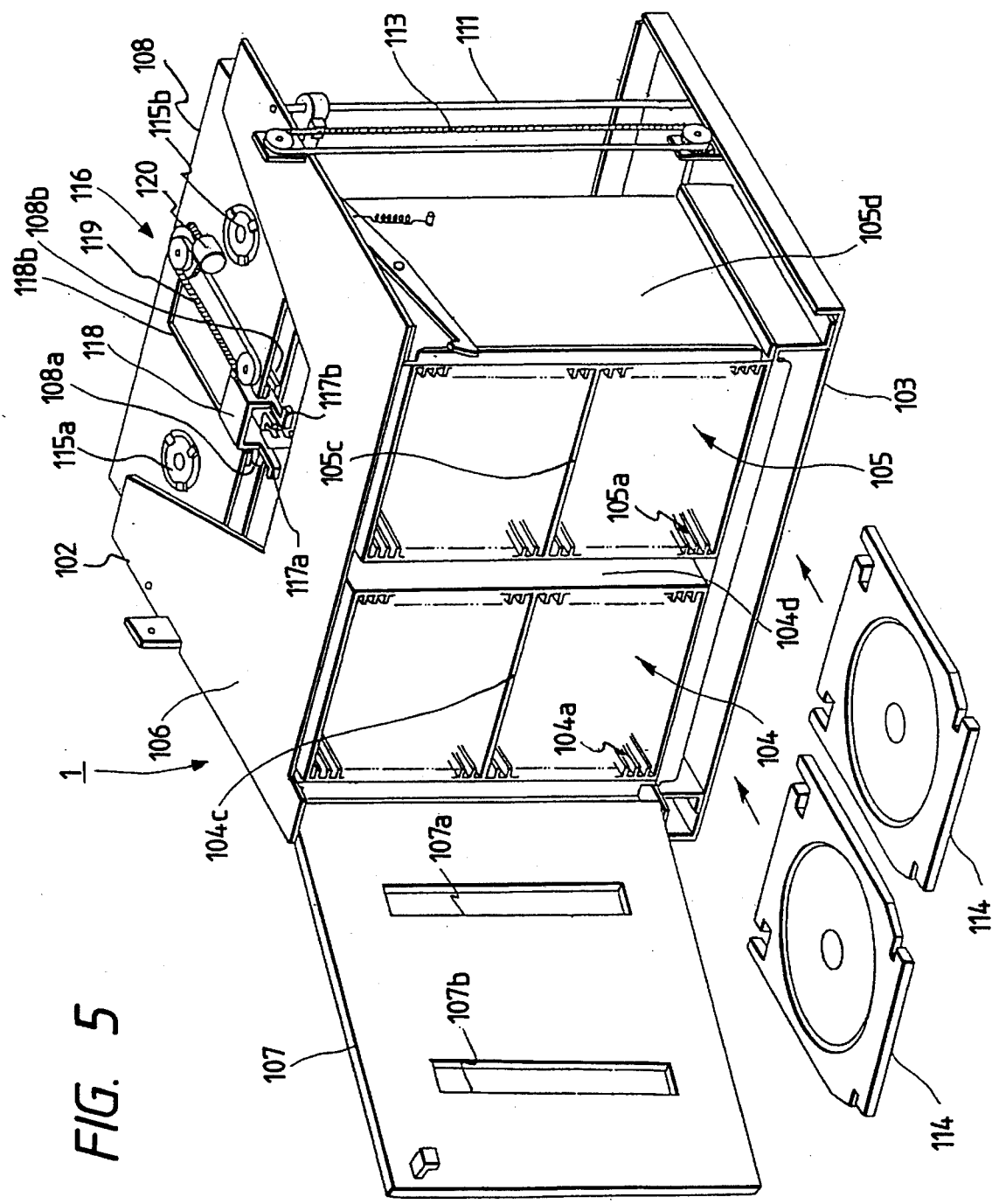
FIG. 5 is a perspective view showing an auto player as a recording/reproducing apparatus including an auto changer for a disk-like recording medium in accordance with a first embodiment of the present invention.

FIG. 5 is a perspective view showing the auto player 1 as a recording/reproducing apparatus including an auto changer for a disk-like recording medium in accordance with the first embodiment of the present invention. The auto player 1 comprises two, right and left, tray stockers 104, 105 disposed on a base plate 103 of a casing 102. Above the tray stockers 104, 105, there is provided a ceiling plate 106. The front door 107 is hingedly supported at a left edge of the casing 102 so as to close a front end of the casing 102 between the ceiling plate 106 and the base plate 103.

A lifter 108, serving as a vertical transportation means, is disposed behind the tray stockers 104, 105. A record/reproduce unit 206 is disposed below the lifter 108, i.e. on the base plate 103. A pair of timing belts 113 is provided at right and left sides of the casing 102, so as to extend vertically from the ceiling plate 106 and the base plate 103. Each timing belt 113 is entrained by pulleys, and is driven by an appropriate motor which will be explained in detail later. A guide rod 111 is provided near the timing belt 113, so that the lifter 108 slides along this guide rod 111. The edge of the lifter 108 is fixed to the timing belt 113. As the motor rotates, the timing belt 113 travels in a vertical direction together with the lifter 108. The lifter 108 is equipped with two disk clampers 115a, 115b and a tray extraction mechanism 116.

Each of the tray stockers 104, 105 is provided with approximately 50 multistage horizontal guide grooves 104a, 105a approximately 50 steps. Each tray 114 is inserted into a space between these horizontal guide grooves 104a, 105a. These horizontal guide grooves 104a, 105a are configured in such a manner that a tray 114 accommodating the recording medium is inserted from a front end thereof and is extracted from a rear end thereof, or vice versa. That is, each tray 114 can be inserted and extracted from either side of the front and rear ends of the tray stockers 104, 105. The tray stockers 104, 105 are integrally formed with partition plates 104c, 105c at the center thereof, respectively. These partition plates 104c, 105c serve as effective reinforcements for the tray stockers 104, 105. With these partition plates 104c, 105c, for example, right and left side walls 104d, 105d can be thinned more. Furthermore, existence of the partition plates 104c, 105c is convenient for confirming the position of each tray 114. It is needless to say that more partition plates can be added or, on the contrary, all the partition plates can be removed if not required.

As the front door 107 is equipped with transparent windows 107a, 107b, it is easy to discriminate the tray 114. If a front end surface of each tray 114 is differently colored in accordance with category of music, the discrimination of each tray 114 will become more easy.

Figure 6:
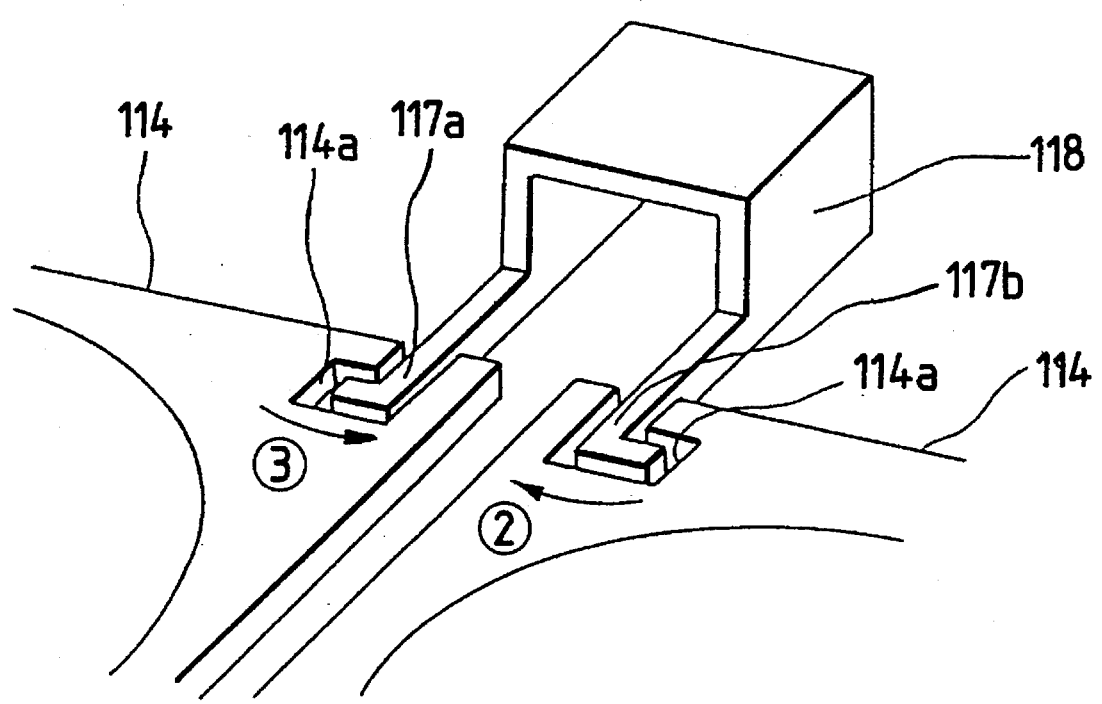
FIG. 6 is a perspective view showing a clamper for extracting a tray in accordance with the first embodiment of the present invention.

The lifter 108 is also formed with horizontal guide grooves 108a, 108b for holding the trays 114, 114. Although FIG. 5 shows only the inside horizontal grooves 108a, 108b, the lifter 108 includes outside horizontal grooves, too. The tray extraction mechanism 116 includes a slider 118 having a pair of symmetrically bifurcated extraction claws 117a, 117b. The slider 118 is fixed to a horizontal belt 119 at the right end thereof. This horizontal belt 119 is driven by a motor 120 provided on an upper plate of the lifter 108. The lifter 108 is formed with a guide groove 118b extending in a back-and-forth direction. The slider 118 engages with this guide groove 118b so as to slide in the back-and-forth direction. As the motor 120 rotates, the horizontal belt 119 travels in the back-and-forth direction together with the slider 118. Thus, the extraction claws 117a, 117b can engage with the trays 114, 114 when extended forward, as shown in FIG. 6. Each tray 114 has a recessed portion 114a for engaging with the extraction claw 117a or 117b. The right extraction claw 117b has an L-shaped configuration, and the left extraction claw 117a has a reversed L-shaped configuration. When the trays 114,114 are extracted, a bending moment acts on each extraction claw 117a or 117b as indicated by an arrow 2 or 3 as shown in FIG. 6. These bending moments, however, oppose with each other so as to cancel both bending moments. Accordingly, substantially no bending force is imparted on the slider 118. As the extraction claws 117a, 117b are loosely coupled with the recessed potions 114a, 114a, the extraction claws 117a, 117b can smoothly move in the vertical direction.

The trays 114, 114, extracted by the extraction claws 117a, 117b, move from the tray stockers 104, 105 to the horizontal guide groove 108a, 108b of the lifter 108. On the contrary, the trays 114,114 are returned from the horizontal guide groove 108a, 108b to the tray stockers 104, 105 by the extraction claws 117a, 117b. The disk clampers 115a, 115b serve to firmly hold the disks for reproduction.

Figure 7:
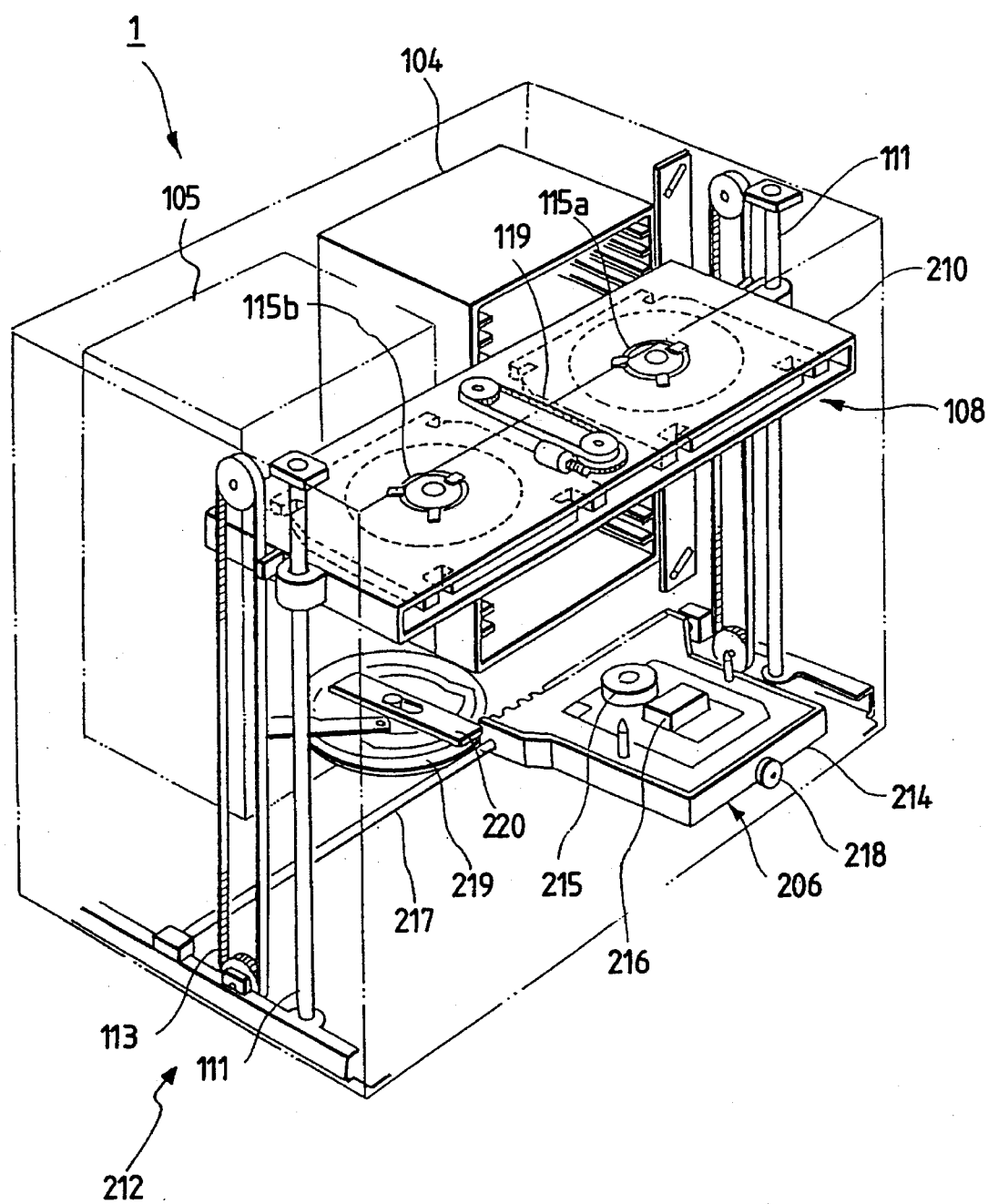
FIG. 7 is a perspective view showing a rear side of the auto player of the recording/reproducing apparatus including the auto changer for a disk-like recording medium in accordance with the first embodiment of the present invention.

Next with reference to FIGS. 5 and 7, the auto player 1 will be explained as a recording/reproducing apparatus including an auto changer for a disk-like recording medium in accordance with a first embodiment of the present invention. The auto player 1 includes the lifter 108 serving as a vertical transporting mechanism disposed behind the tray stockers 104,105. The lifter 108 includes a holder base 210 and a vertical driving mechanism 212. The holder base 210 is provided thereon with the horizontal belt 119 serving as a horizontal feeding mechanism. The vertical driving mechanism 212 includes the guide rod 111 loosely coupled with the holder base 210 so as to guide in the vertical direction and the timing belt 113 disposed in parallel with the guide rod 111 and fixed to the end of the holder base 210.

The record/reproduce unit 206 comprises a slide base 214, a turning table 215, and a laser pick-up device 216. The record/reproduce unit 206 is disposed below the lifter 108. The slide base is coupled with a guide rail 217 at a front end thereof and is supported by a wheel 218, so as to slide in a right-and-left direction. Hence, the record/reproduce unit 206 can position at predetermined two, right and left, positions so as to receive a disk from the right or left tray transported by the lifter 108.

The record/reproduce unit 206 is associated with a lateral feeding means 219 for shifting the slide base 214 in the right-and-left direction and a positioning means 220 for fixing the slide base 214 when the record/reproduce unit 206 reaches the predetermined right or left position. Although not shown in the drawing, a player control unit is also provided in the auto player 1.

An operation of the auto player 1 will be explained below. As shown in FIG. 5, trays 114, 114 respectively accommodating a disk therein are inserted into the right and left tray stockers 104, 105 from the front end of the casing 102 while the front door 107 is opened. The tray stockers 104, 105 of this embodiment can store approximately 100 trays 114.

After the front door 107 is closed, the lifter 108 is lowered to a designated position to select a disk. Then, the tray extraction mechanism 116 extends forward to cause the extraction claws 117a, 117b to engage with the recessed portions 114a, 114a of the trays 114, 114 disposed at the same height of the right and left tray stockers 104, 105. Subsequently, the right and left trays 114, 114 are extracted from the tray stockers 104, 105 onto the lifter 108. It is noted that the present embodiment is characterized in that both the right and left trays 114, 114 disposed at the same height of the right and left tray stockers 104, 105 are extracted simultaneously. Meanwhile, the lifter 108 serving as a vertical transporting means is shifted to the designated side, i.e. either of the predetermined right and left positions, for receiving the disk.

The lifter 108 moves downward until it reaches the record/reproduce unit 206 and, in turn, the disk is mounted onto the turning table 215. Thereafter, the laser pick-up device 216 reads information from the disk for reproduction. If the reproduction is over, the disk is returned to the original tray stocker in an opposite way. By repeating such an operation, numerous, e.g. 100, disks can be reproduced continuously and successively.

Figure 11:
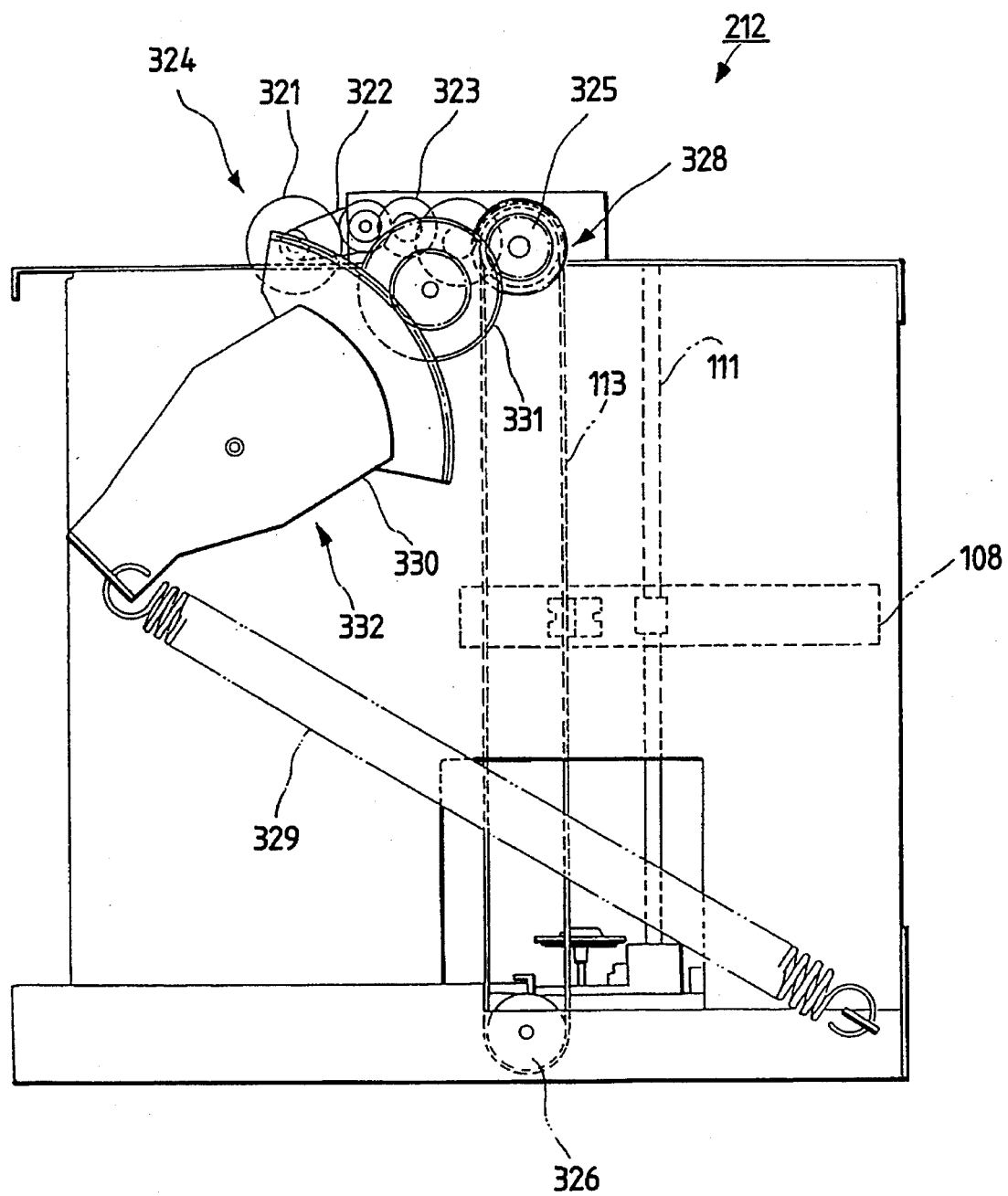
FIG. 11 is a side view showing a vertical driving mechanism for a lifter in accordance with the present invention.
Figure 12:
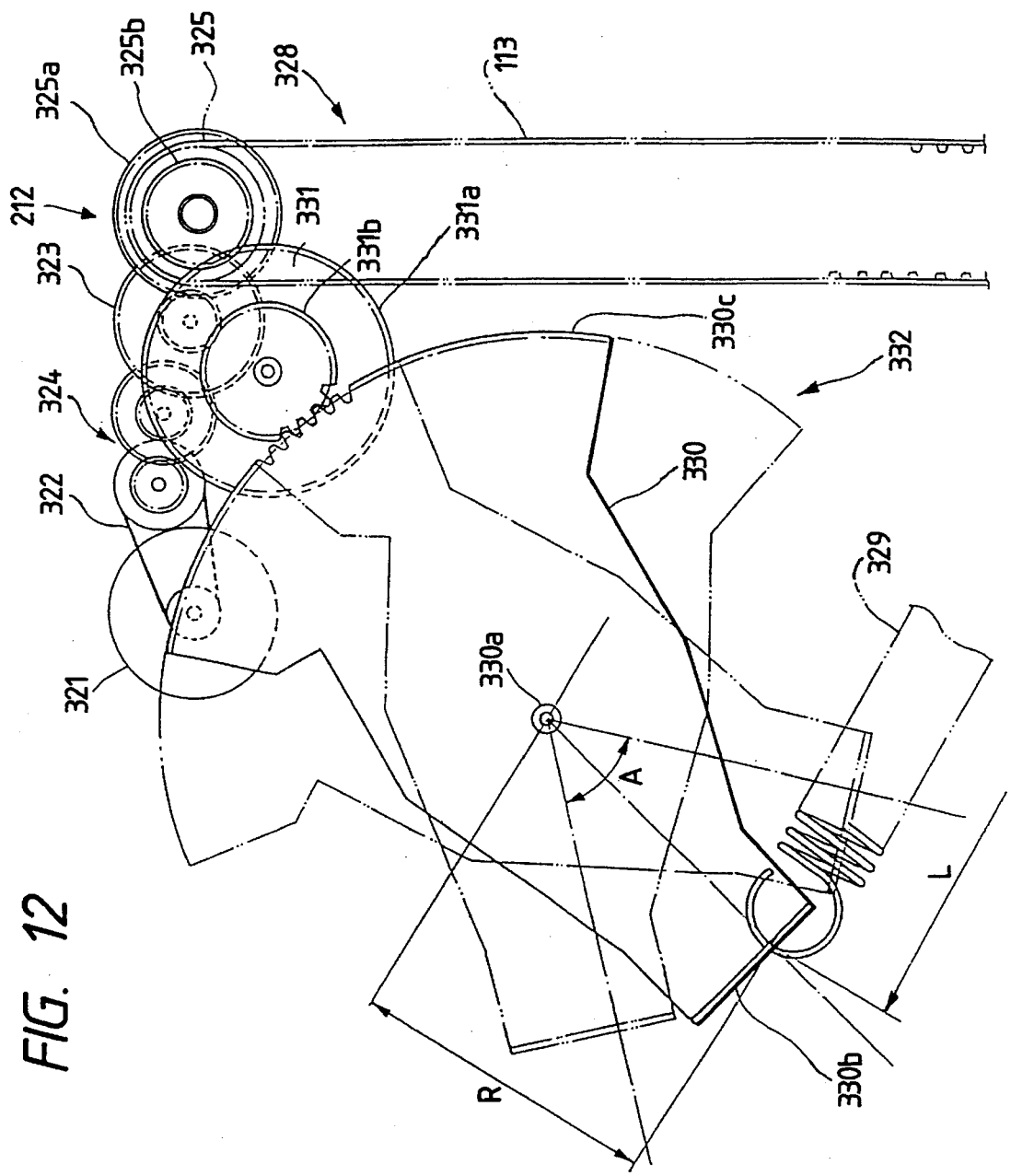
FIG. 12 is an enlarged view showing an essential part of the vertical driving mechanism of FIG. 11.
Figure 13:
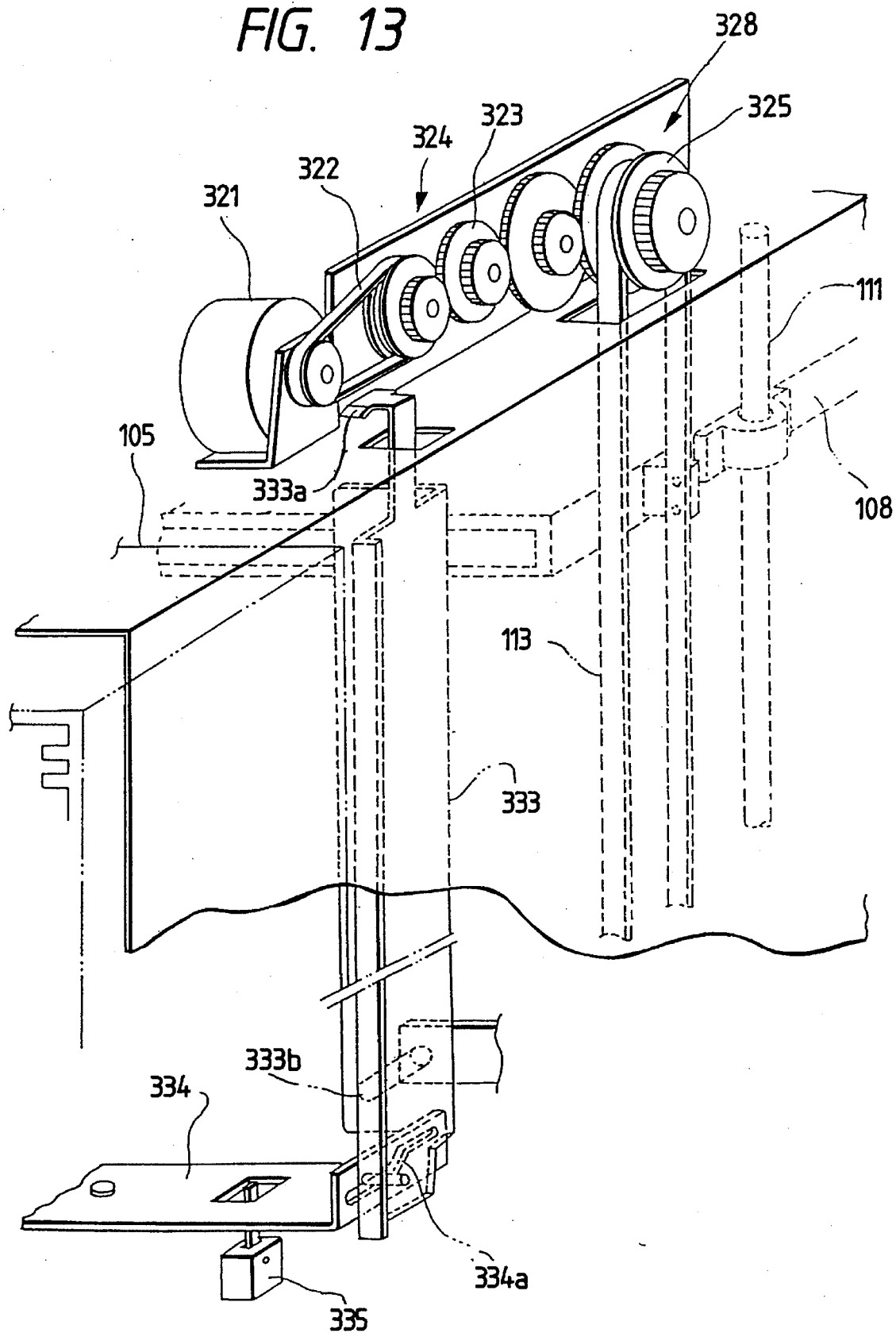
FIG. 13 is a perspective view showing a lock mechanism for a lifter in accordance with the present invention.
Figure 14:
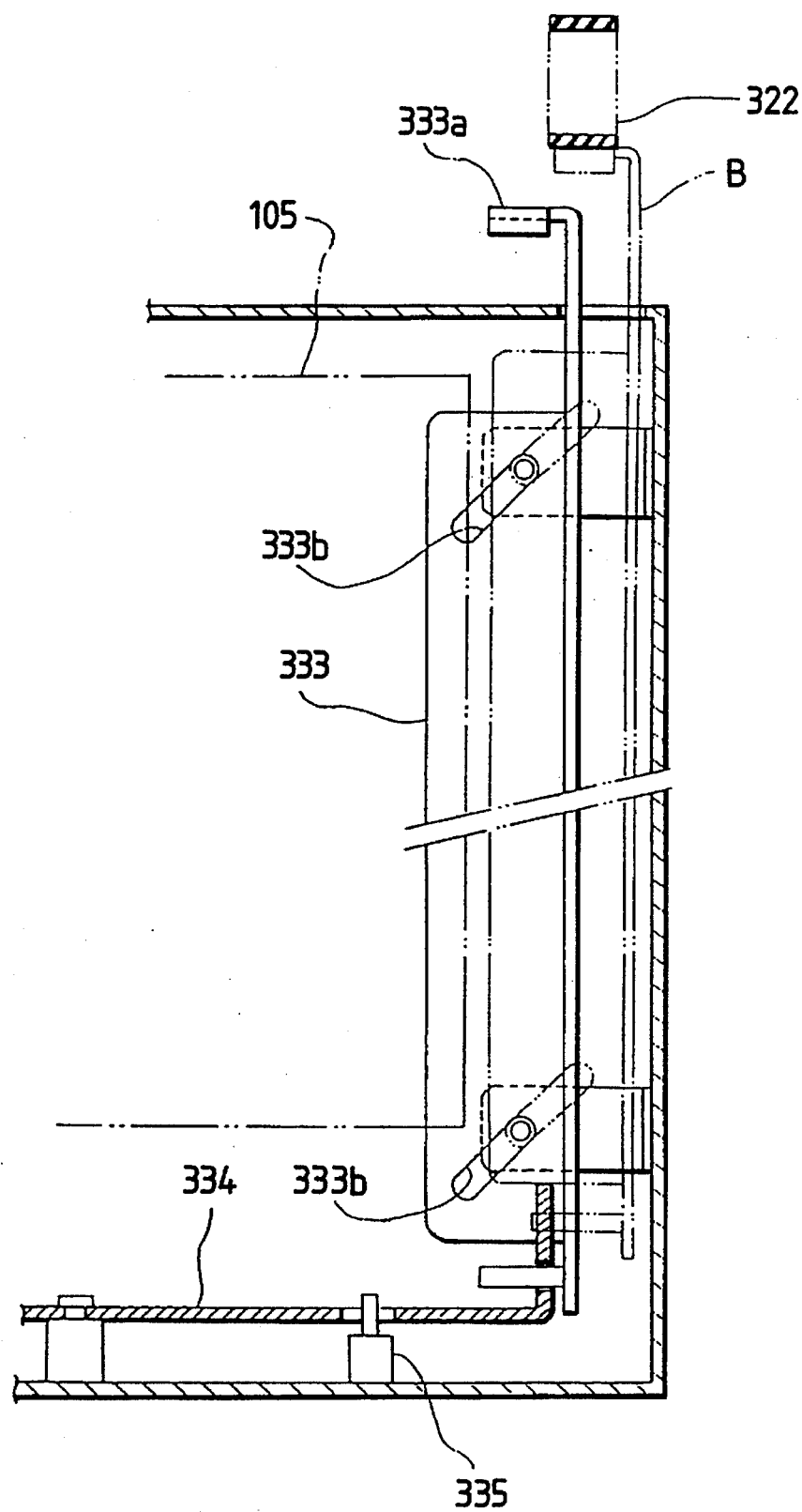
FIG. 14 is a view illustrating an operation of the lock mechanism for the lifter in accordance with the present invention.

Next, structural features and operation of the vertical driving mechanism 212 of the lifter 108 will be explained. FIG. 11 is a side view showing a vertical driving mechanism 212 for the lifter 108 in accordance with the present invention. FIG. 12 is an enlarged view showing an essential part of the vertical driving mechanism of FIG. 11. FIG. 13 is a perspective view showing a lock mechanism for the lifter 108 in accordance with the present invention. And, FIG. 14 is a view illustrating an operation of the lock mechanism for the lifter 108.

In FIG. 11, the vertical driving mechanism 212 is basically constituted by three portions, i.e. a driving portion 324, a vertical belt portion 328, and a constant torque adding portion 332. The driving portion 324 includes a motor 321, a belt 322, and a reduction gear train 323. The vertical belt portion 328 includes upper and lower pulleys 325,326 and the timing belt 113 entrained by the pulleys 325, 326. The timing belt 113 is fixedly connected to the lifter 108. And, the constant torque adding portion 332 includes a swing arm 330 urged by a spring 329 and a reduction gear 331. By the urging force of the spring 329, the constant torque adding portion 332 imposes substantially constant torque on the lifter 108.

In FIG. 12, the upper pulley 325 of the vertical belt portion 328 comprises a large-diameter gear 325a and a small-diameter gear 325b coaxially formed with each other. The large-diameter gear 325a meshes with the reduction gear train 323 of the driving portion 324. The small-diameter gear 325b meshes with a large-diameter gear 331a of the reduction gear 331 of the constant torque adding portion 332.

The swing arm 330 of the constant torque adding portion 332 is supported on a support shaft 330a so as to cause a swing motion about the support shaft 330a. The swing arm 330 has a base end 330b engaged with the spring 329 and a sector gear portion 330c formed at opposite side of the base end 330b. The sector gear portion 330c meshes with a small-diameter gear 331b of the reduction bear 331. This swing arm 330 is connected through the reduction gear 331 with the vertical belt portion 328. Therefore, the swing arm 330 causes a predetermined swing motion within a relatively small angle A with respect to the full stroke of the lifter 108 because of reduction ratio of the reduction gear 331. An action line of the spring force is spaced from the support shaft 330a by a distance R. As the swing angle A of the swing arm 330 is small, the distance R is maintained at substantially the same value. And, a change of the overall length L of the spring 329 can be suppressed within a small value. Thus, substantially constant torque can be generated. This constant torque is added to the upper pulley 325 so as to balance with the weight of the lifter 108.

In FIG. 13, a gate 333 is provided near a right side wall of the auto player 1 so as to close or open the rear side of the right tray stocker 105. Another gate 333 having the symmetrical structure is provided at a left side wall of the auto player 1, although it is not shown in the drawing. This gate 333 has an upper end 333a facing to the belt 322 of the driving portion 324. This upper end 333a serves as a lock member for locking the lifter 108. The gate 333 has a longitudinal surface and a lateral surface normal to one another. The longitudinal surface extends in the back-and-forth direction and the lateral surface extends in the right-and-forth direction. The gate 333 includes a pair of obliquely elongated holes 333b, 333b opened at appropriate upper and lower portions on the lateral surface thereof. A lower end of the gate 333 is connected to a swing lever 334 through a cam mechanism 334a. The cam mechanism 334a functions to move the gate 333 in the vertical direction with respect to the swing lever 334. A reference numeral 335 represents a limit switch for controlling a swing region of the swing lever 334.

The gates 333 normally close the rear end of the tray stockers 104, 105, so that the trays 114, 114 inserted from the front end of the auto player 1 into the tray stockers 104, 105 can be stopped by the lateral surfaces of the gates 333.

If the swing lever 334 is shifted to lift the gate 333 upward by means of the cam mechanism 334a, the gate 333 causes laterally outward displacement by the function of the obliquely elongated holes 333b, 333b, as well as an upward movement as shown by a phantom line B in FIG. 14. That is, the right and left gates 333, 333 are no longer obstructions against the trays 114, 114 stored in the tray stockers 104, 105. The rear end of the tray stockers 104, 105 are fully opened so that the trays 114,114 can be fed toward the lifter 108 beyond the gates 333,333. In this case, the lock member 333a integrally formed with the gate 333 extends upward until it abuts the lower surface of the belt 322 of the driving portion 324. As the driving portion 324 is directly connected with the vertical belt portion 328 so as to move together, the movement of the lifter 108 is surely locked upon abutment of the lock member 333a to the belt 322.

A vertical driving operation of the auto player 1 will be explained below. In response to an operation of the remote controller 3 of FIG. 4, the control unit 2 sends a record/reproduce command to the auto player 1. Then, the driving portion 324 of the vertical driving mechanism 212 actuates the upper pulley 325 of the vertical belt portion 328, so that the lifter 108 initiates moving in the up-and-down direction to extract the selected disks from the tray stockers 104,105. The timing belt 113 meshing with the upper pulley 325 conveys the lifter 108 in the up-and-down direction. On the other hand, the constant torque adding portion 332 directly meshing with the upper pulley 325 gives a force opposing the weight of the lifter 108. Because, the swing arm 330 and the reduction gear 331 are constructed to generate the above opposing force.

As explained previously, a product of the overall length L of the spring 329 and the action radius R of the swing arm 330 causes less change during the vertical movement of the lifter 108. Thus, the vertical driving mechanism 212 receives substantially no affection of weight of the lifter 108. Thus, it becomes possible to reduce capacity or power of the motor 321. At the same time, the control of the vertical driving mechanism 212 will be simplified since there is no need of differentiating an upward shift movement from a downward shift movement. In order to reduce the change of the overall length L of the spring 329, it is preferable to shorten the action radius R.

When the lifter 108 reaches a position of the designated disk, the swing lever 334 shown in FIG. 13 is swung so that the gates 333, 333 move upward and outward through the cam mechanism 334a and the obliquely elongated holes 333b, 333b. With this movement of the gates 333, 333, the rear end of the tray stockers 104, 105 are fully opened and the lock member 333a abuts the lower side of the belt 322 as shown by the phantom line B of FIG. 14. Accordingly, the lifter 108, connected through the vertical belt portion 328 to the driving portion 324, is completely locked not to move in the vertical direction.

Subsequently, the disk is extracted from the tray stocker to the lifter 108. Thereafter, the gate 333 is closed and the lock member 333a returns to the original position as indicated by a solid line in FIG. 14. Thus, the lifter 108 is unlocked and initiates moving downward to reach the record/reproduce unit 206.

In this manner, the gate 333 functions as a stopper when a disk is inserted together with its tray into the tray stocker 104 or 105 from the front end of the auto player 1. Namely, the disk is prevented from interfering with the lifter 108. Even if vibration is caused by high-speed movement of the lifter 108, the disks in the tray stockers 104, 105 are firmly fixed in position. Exchange operation, i.e. insertion and pulling out of disks, will be fairly speeded up.

Integrally forming the lock member 333a with the gate 333 is advantageous in realizing a simplified structure of a lock mechanism.

Figure 15:
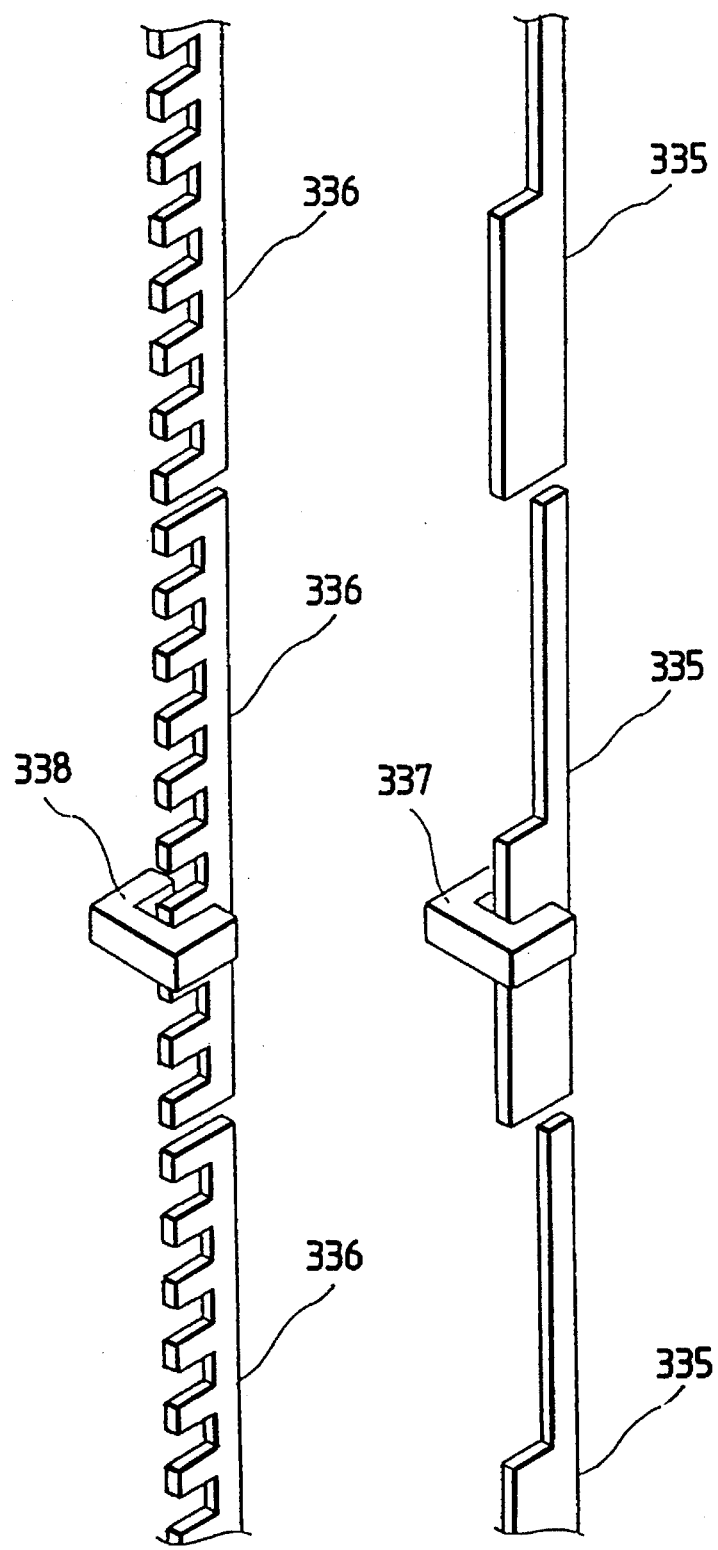
FIG. 15 is a perspective view showing one example of a vertical position detector of the lifter in accordance with the present invention.
Figure 16:
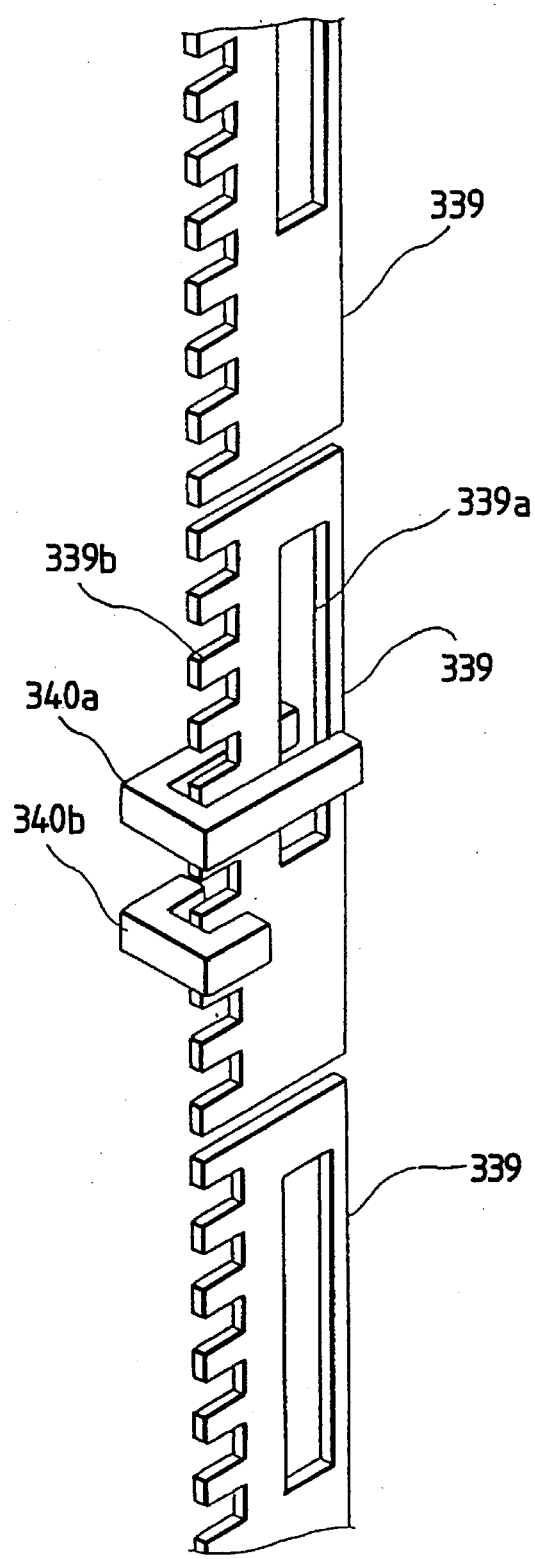
FIG. 16 is a perspective view showing another example of the vertical position detector of the lifter in accordance with the present invention.

FIG. 15 is a perspective view showing one example of a vertical position detector of the lifter 108 in accordance with the present invention, and FIG. 16 is a perspective view showing another example of the vertical position detector in accordance with the present invention. The example of FIG. 15 includes two different kinds of slit members 335, 336. The slit member 335 has an interval corresponds to vertically piled up 10 trays in the tray stocker 104 or 105 (i.e. 10 horizontal guide grooves). The slit member 336 has an interval corresponds to one tray in the tray stocker 104 or 105 (i.e. one horizontal guide groove). These slit members 335 and 336 are provided at appropriate portions such as a central portion close to the tray stockers 104, 105 or both right and left sides of the lifter 108.

A pair of detectors 337 and 338 is fixed on the lifter 108. These detector 337 and 338 are respectively constituted by a U-shaped optical sensor which sends a light from one end thereof and receives the light at the other end thereof. These detectors 337 and 338 are positioned to stride over the slit members 335 and 336, respectively. More specifically, the detectors 337 and 338 move in the vertical direction together with the lifter 108. During this vertical displacement the lights emitted from one ends of the detectors 337 and 338 cross the slits of the slit members 335 and 336, respectively; therefore, the other ends of the detectors 337 and 338 receive intermittent lights. By counting the number of received lights (i.e. the number of slits), the detectors 337 and 338 can detect the vertical displacement of the lifter 108.

When the lifter 108 is moved speedily, its shift control is performed on the basis of the signal obtained from the large-slit detector 337. On the contrary, when the lifter 108 is moved slowly for accurately positioning, its shift control is performed on the basis of the signal obtained from the small-slit detector 338. Thus, the searching of the designated disk can be quickly accomplished.

Another example of FIG. 16 includes the same kind of slit members 339, 339. This slit member 339 is formed with a large slit 339a and numerous small slits 339b disposed in parallel with each other so as to extend in the vertical direction. The large slit 339a is functionally identical with the large slit member 335 in FIG. 15.

A horizontally elongated U-shaped detector 340a is provided close to the large slit 339a so as to detect the number of the large slits 339a passing across a light of the detector 340a. Meanwhile, a smaller U-shaped detector 340b is provided close to the small slits 339b so as to detect the number of the small slits 339b passing across a light of the detector 340b.

Figure 17:
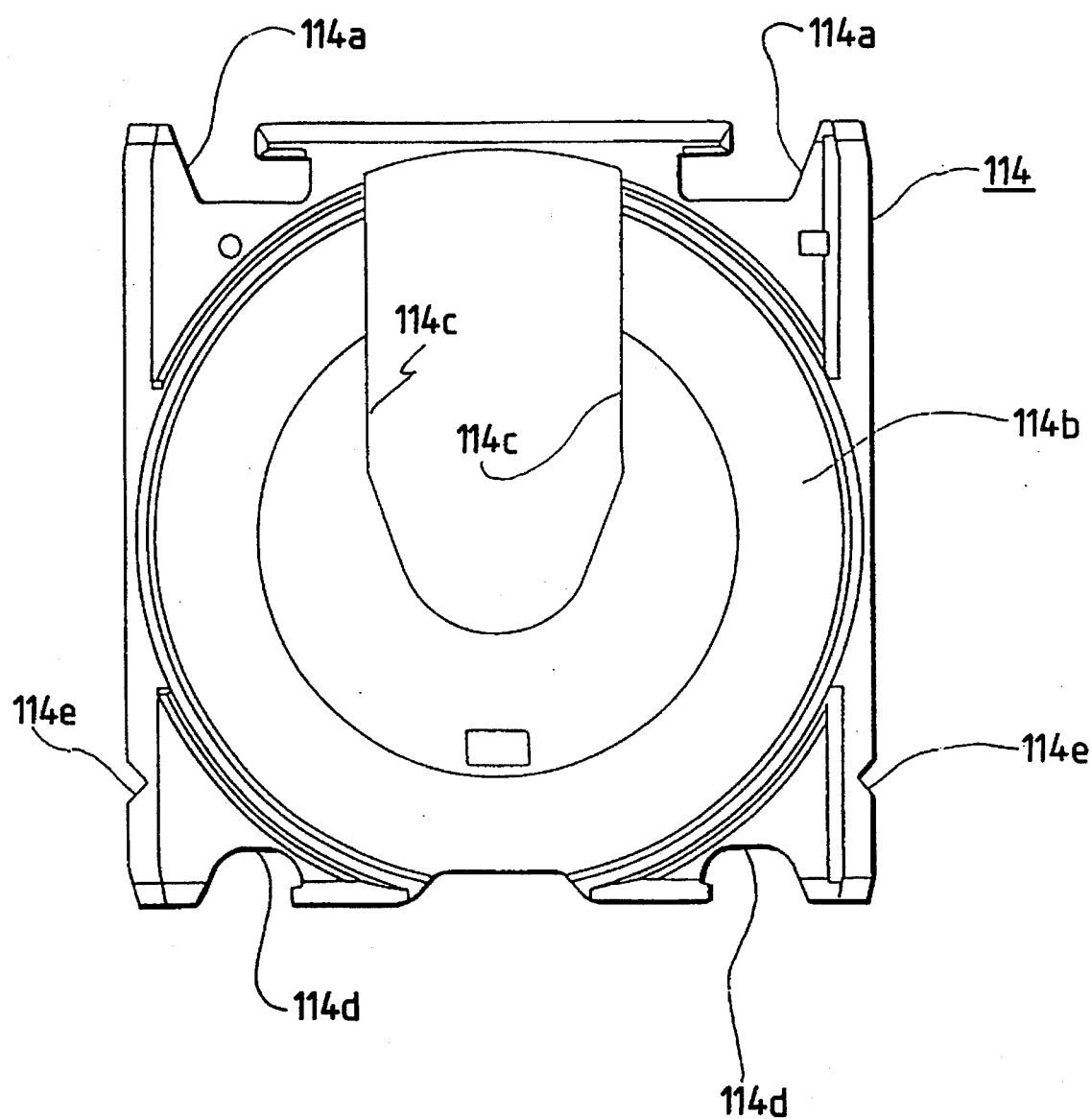
FIG. 17 is a plane view showing a tray in accordance with the present invention.
Figure 18:
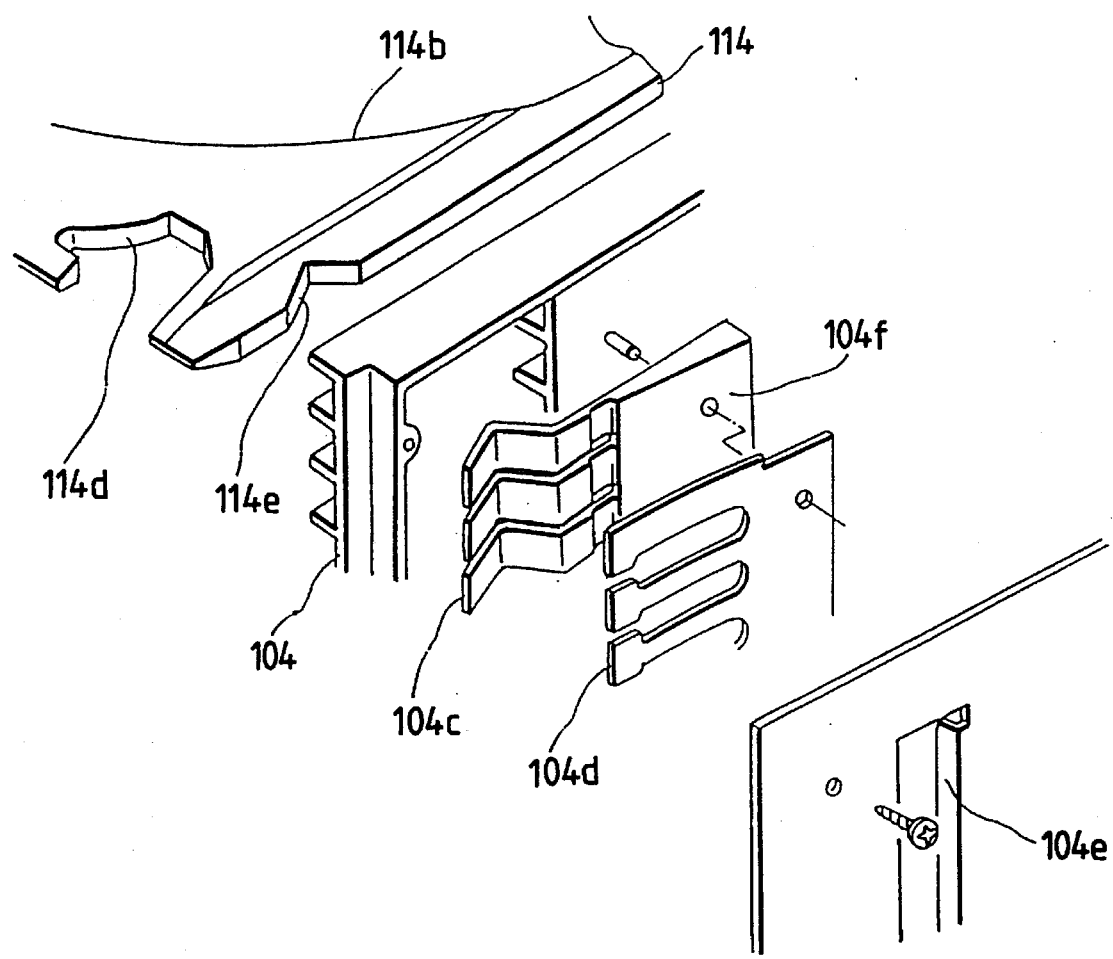
FIG. 18 is an exploded perspective view illustrating a positioning mechanism between the tray and the tray stocker.

Next, the tray 114 and its retaining mechanism will be explained. FIG. 17 is a plane view showing a detailed construction of the tray 114 in accordance with the present invention. FIG. 18 is an exploded perspective view illustrating a positioning mechanism between the tray 114 and the tray stocker 104 (or 105). In FIG. 17, the tray 114 is recessed at the center thereof to form a shallow circular concave portion 114b, into which a disk is accommodated. This concave portion 114b includes an access hole 114c for recording/reproduction, which radially extends from a center to a rear edge of the tray 114. The tray 114 has a pair of symmetrically formed right and left cutouts 114a, 114a at the rear edge thereof. These cutouts 114a, 114a are respectively formed in a bent shape. Similarly, the tray 114 has a pair of symmetrically formed right and left cutouts 114d, 114d at the front edge thereof. These cutouts 114d, 114d are respectively formed in a bent shape different from the cutout 114a. Furthermore, the tray 114 has a pair of symmetrically formed right and left cutouts 114e, 114e at right and left edges thereof. These cutouts 114e, 114e are respectively formed in a V shape. The tray 114 itself is made of hard resin material. The cutouts 114d, 114d formed at the front ends of the tray 114 serve as grips for pulling out the tray 114 forward from the tray stocker 104 or 105. On the other hand, the cutouts 114a, 114a formed at the rear ends of the tray 114 serve as hooks engaging with the extraction claws 117a, 117b. Separating these cutouts 114a, 114a and 114d,114d at front and rear ends of the tray 114 is advantageous in that disk exchange operation by a user and disk pick-up operation by the lifter 108 can be completely separated. It will become easy to flexibly modify the construction of the auto player.

In FIG. 18, the tray stocker 104 includes a positioning claw 104c engaging with the V-shaped cutout 114e of the tray 114, a leaf spring 104d elastically urging a distal end of the positioning claw 104c, and a fastener 104e fixing the leaf spring 104d.

The positioning claw 104c is made of resin material in order to assure sliding smoothness against the tray 114. The positioning claw 104c has a base end formed with an inclined surface 104f thereon. The metallic leaf spring 104d is installed on this inclined surface 104f. Distal ends of the positioning claws 104c and the leaf spring 104d are respectively divided into a plurality of thin pieces corresponding to the trays 114 piled up in the tray stocker 104, so that each tray 114 can be independently fixed its position by exclusively provided positioning claw and leaf spring pieces. Thus, the positioning of the trays 114 can be realized by the simplified structure above described without requiring a highly accurate positioning control.

Figure 8:
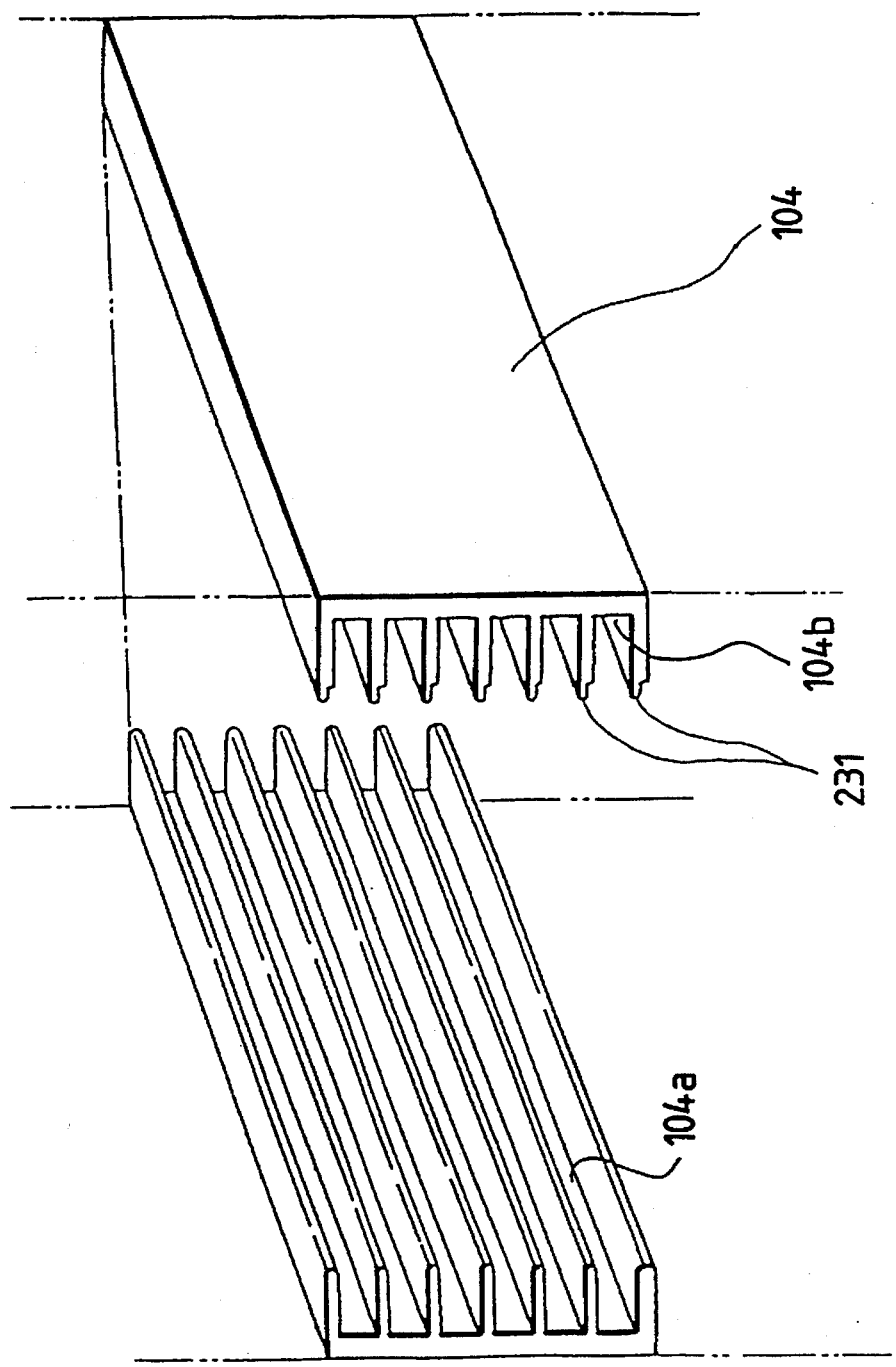
FIG. 8 is a perspective view showing horizontal guide grooves for storing trays.

A guide mechanism for shifting the tray 114 will be explained below. FIG. 8 is a perspective view showing horizontal guide grooves 104a, 104b formed in the tray stocker 104. FIGS. 9(A)–9(D) are views showing relationship between the horizontal guide grooves 104a, 104b and a tray 114 inserted therein in various ways. It is noted that the tray stocker 105 is identical with the tray stocker 104 in its inside structure. Therefore, only the try stocker 104 will be explained below.

In FIG. 8, the tray stocker 104 has an inside wall being formed with multistage guide members 231. These multistage guide members 231 constitute the right and left horizontal guide grooves 104a, 104b. The tray 114 has a thin plate-like cross section and has guide portions 233, 233 at right and left ends thereof as shown in FIGS. 9(A)–9(D). The guide member 231 defines a guide groove engaging with the guide portion 233 of the tray 114.

Figure 9A:
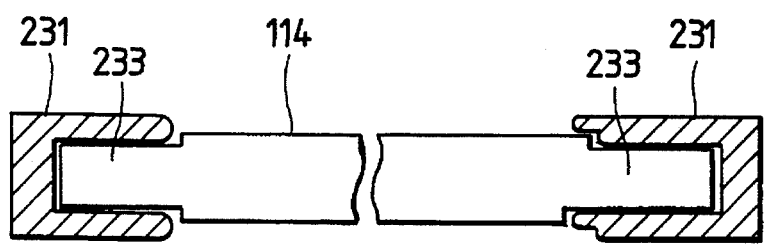
FIGS. 9(A)–9(D) are views showing relationship between the horizontal guide grooves and a tray inserted therein in various ways.
Figure 9B:
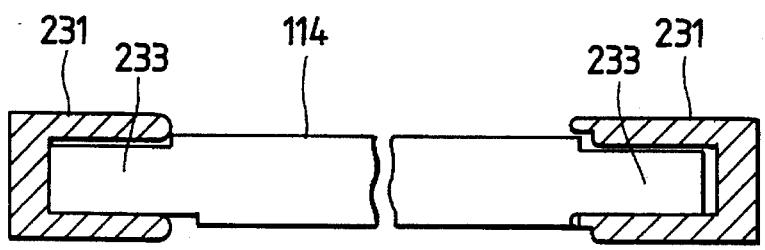
Figure 9C:
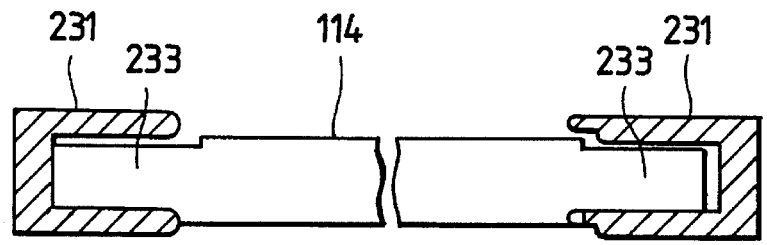
Figure 9D:
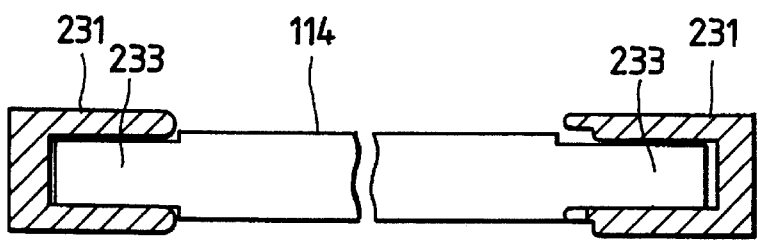

FIG. 9(A) shows a normal condition. The guide portions 233,233 are formed asymmetrically in both right-and-left and up-and-down directions. For this asymmetric arrangement, the tray 114 can be inserted completely only when it is in a regular position as shown in FIG. 9(A). FIG. 9(B) shows a condition wherein the tray 114 is inserted oppositely in the right-and-left direction with respect to condition of FIG. 9(A). FIG. 9(C) shows a condition wherein the tray 114 is inserted oppositely in the up-and-down direction with respect to condition of FIG. 9(B). FIG. 9(D) shows a condition wherein the tray 114 is inserted oppositely in the up-and-down direction with respect to condition of FIG. 9(A). As apparent from the drawings, the guide portions 233 of the tray 114 conflicts with the guide member 231 of the tray stocker 104 in any case of FIGS. 9(B)–9(D). The tray 114 cannot be inserted further; therefore, operation error of the tray 114 will be surely eliminated.

Figure 10:
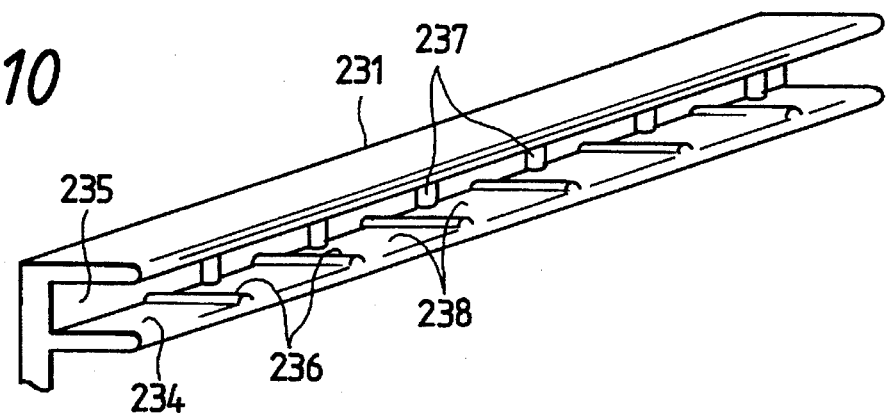
FIG. 10 is a perspective view showing a construction of the horizontal guide groove.

FIG. 10 is a perspective view showing a construction of the horizontal guide groove of the guide member 231. In the guide groove of the guide member 231, there are provided a plurality of ribs 236 and 237 at both bottom and side wall thereof. These ribs 236 and 237 slidingly contact with the lower and side surfaces of the tray 114 so as to guide it when the tray 114 is inserted in this guide member 231. Furthermore, these ribs 236 and 237 have function of scraping debris or dust off the tray 114. Accordingly, sliding resistance of the tray 114 can be always maintained at an adequate value. As debris or dust scraped off the tray 114 accumulates in recessed portions 238, 238 between the bottom ribs 236. It is, thus, possible to keep the tray stockers 104, 105 clean.

Figure 19:
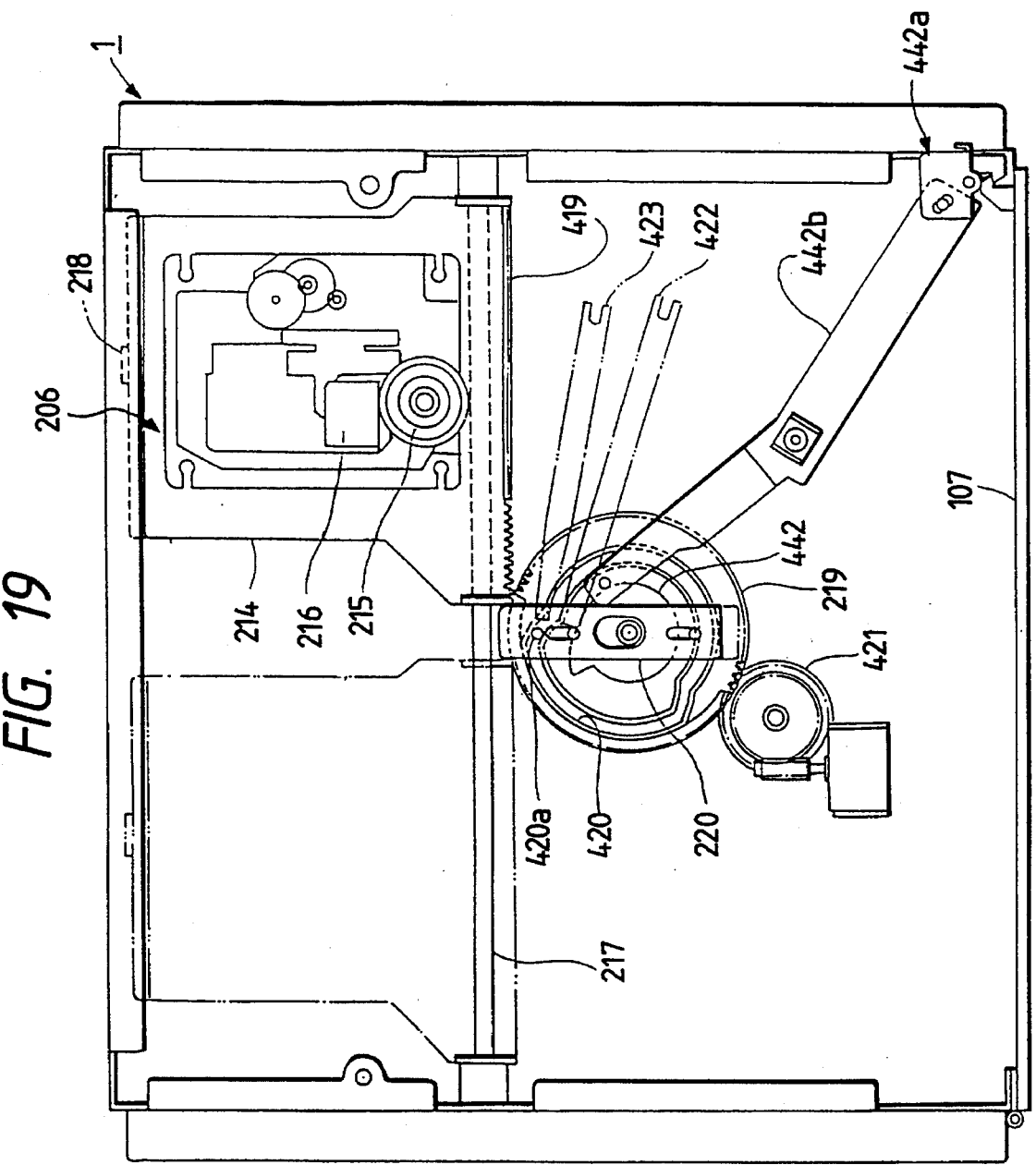
FIG. 19 is a plane view showing a shift mechanism for a record/reproduce means in accordance with the present invention.
Figure 20:
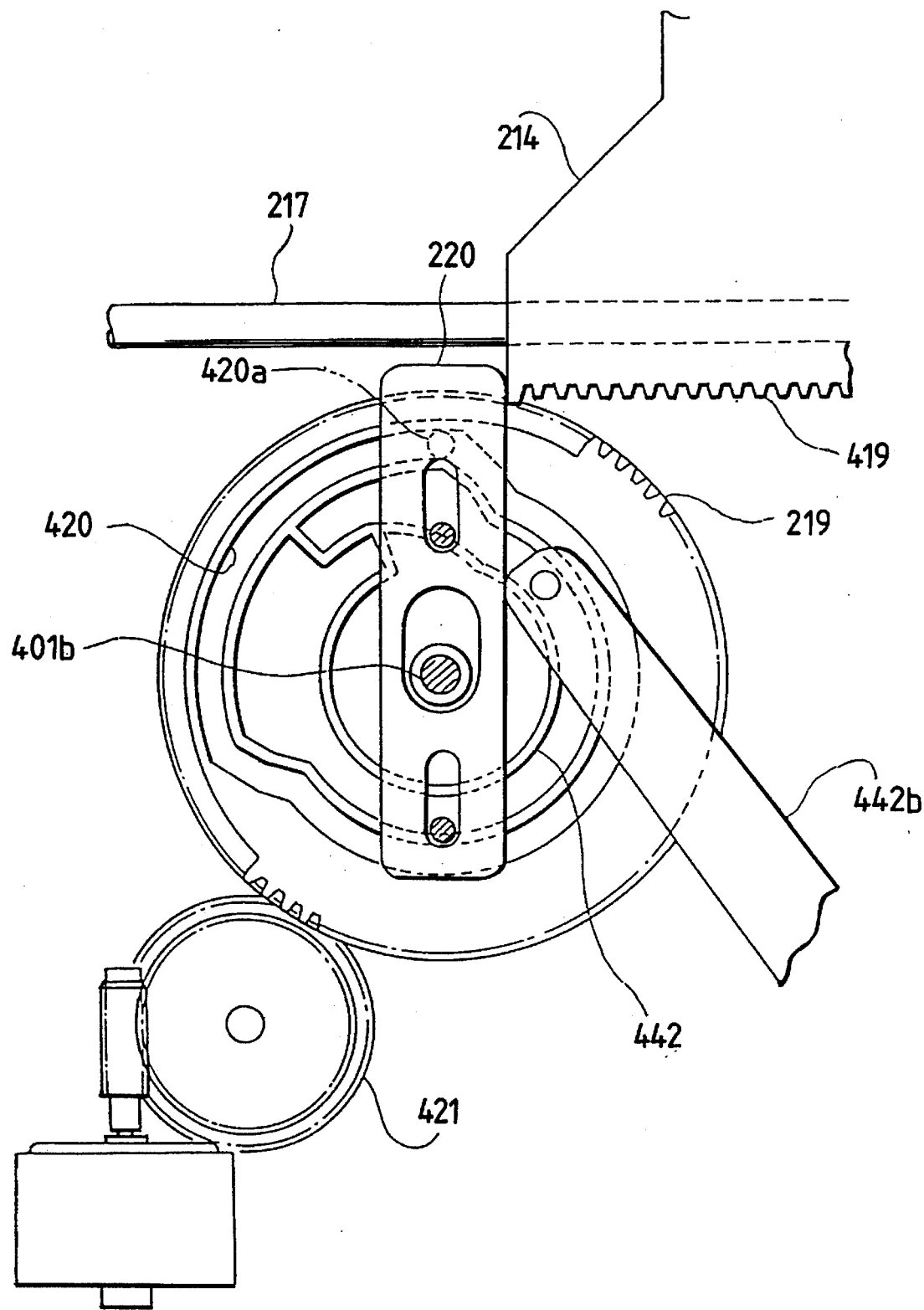
FIG. 20 is an enlarged view showing an essential part of the shift mechanism for the record/reproduce means in accordance with the present invention.
Figure 21A:
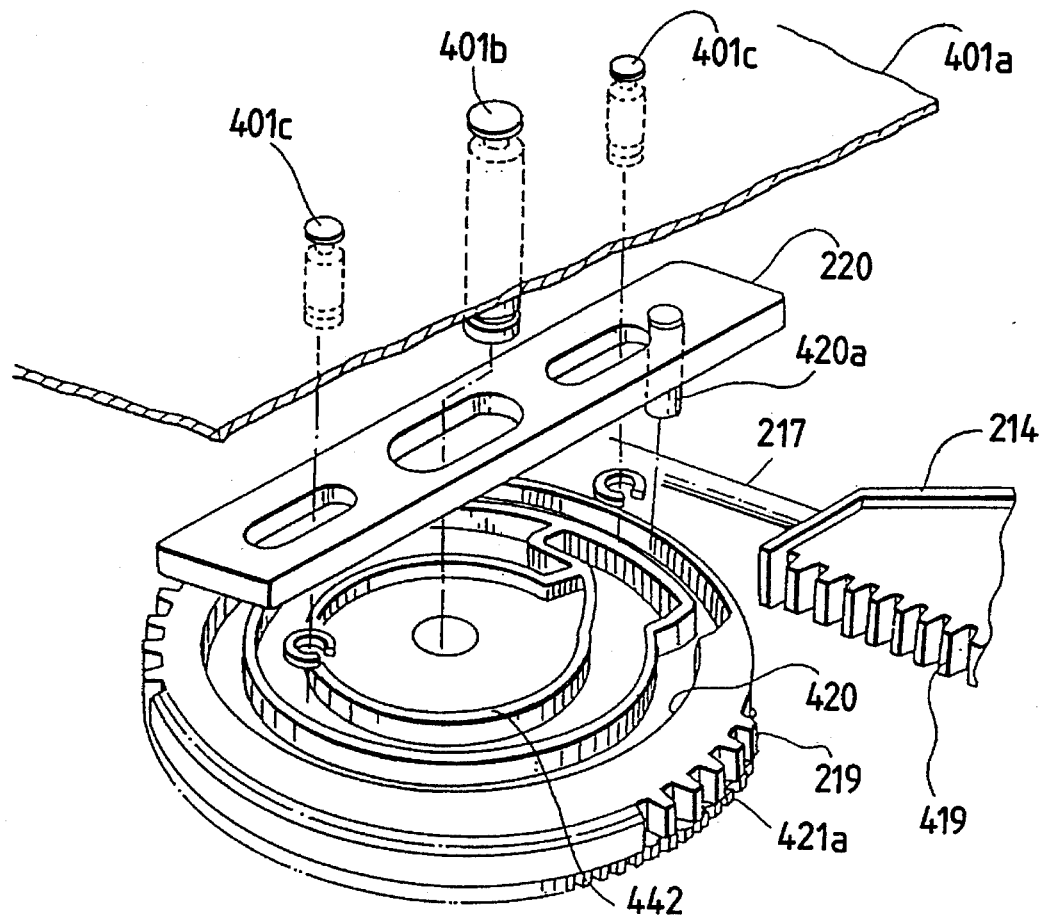
FIG. 21(A) is an exploded enlarged perspective view showing an essential part of the shift mechanism for the record/reproduce means in accordance with the present invention.
Figure 21B:
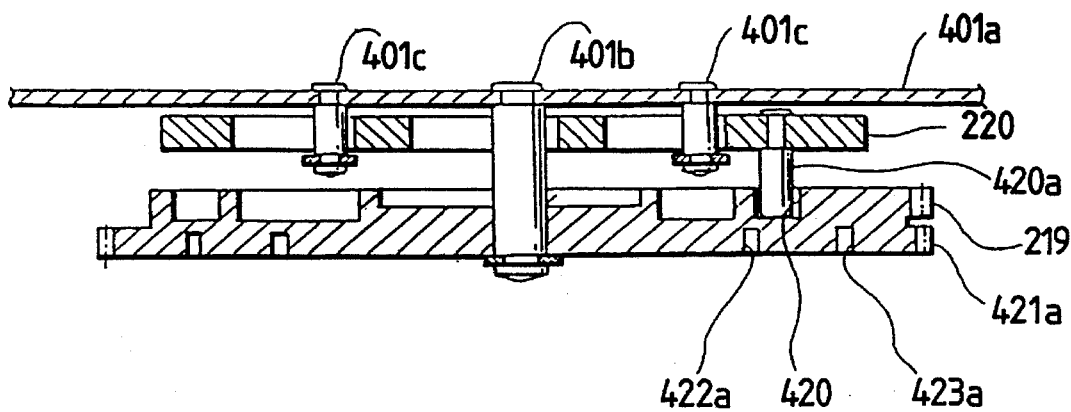
FIG. 21(B) is an enlarged cross-sectional view showing the essential part of the shift mechanism for the record/reproduce means in accordance with the present invention.

Shift and lock mechanisms of the record/reproduce unit 206 will be explained below. FIG. 19 is a plane view showing the shift mechanism for the record/reproduce unit 206 in accordance with the present invention. FIG. 20 is an enlarged view showing an essential part of the shift mechanism in accordance with the present invention. FIG. 21(A) is an exploded enlarged perspective view showing an essential part of the shift mechanism in accordance with the present invention. FIG. 21(B) is an enlarged cross-sectional view showing the essential part of the shift mechanism in accordance with the present invention.

As shown in FIG. 19, the lateral feeding means 219 includes a partially geared pinion and serves as a main gear. The lateral feeding means 219 is meshed with a speed-reduction drive source 421. Furthermore, the lateral feeding means 219 is associated with a door control mechanism 442b and angle detecting mechanisms 422, 423. The door control mechanism 442b engages with or disengages from the lock mechanism 442a of the front door 107.

The slide base 214 of the record/reproduce unit 206 is formed with a rack 419 at the rear edge thereof. The partially geared pinion of the lateral feeding means 219 meshes with the rack 419. Thus, the slide base 214 is moved in the right-and-left direction in accordance with rotation of the partially geared pinion.

The number of teeth on the partially geared pinion of the lateral feeding means 219 is identical with the number of teeth on the rack 419 of the slide base 214. If the lateral feeding means 219 rotates beyond a predetermined angle, the rack 419 is disengaged from the partially geared pinion as shown in FIG. 20. A right and left edge tooth of the rack 419 is made high than other teeth, so as to firmly mesh with the partially geared pinion.

The lateral feeding means 219 includes two cam grooves 420 and 442. The positioning means 220, constituting a lock lever, has three elongated holes which are loosely coupled with three support pins 401c, 401b, 401c fixed beneath a chassis 401a and extending downward. The positioning means 220 is integrally formed with a pin 420a extending downward from the lower surface thereof. The pin 420a is engaged with the cam groove 420 so as to act as a cam follower. The cam groove 420 acts to shift the positioning means 220 so as to serve as a lock lever when the record/reproduce unit 206 reaches a lateral feed limit defined by the disengagement between the rack 419 and the partially geared pinion. That is, when the record/reproduce unit 206 reaches the lateral feed limit, the positioning means 220 locks the record/reproduce unit 206.

The other cam groove 442 is engaged with a cam follower of the door control mechanism 442b. If the lateral feeding means 219 continues rotating after the positioning means 220 has been shifted to its lock position, the door control mechanism 442b locks the lock mechanism 442a.

As shown in FIG. 21(A), the lateral feeding means 219 serving as a main gear is rotatably supported by the shaft 401b fixed beneath the chassis 401a. The lateral feeding means 219 includes at its bottom a gear 421a meshing with the speed-reduction drive source 421 as shown in FIG. 20. The lateral feeding means 219 further has a lower surface formed with cam grooves 422a, 423a. These cam grooves 422a, 423a are engaged with cam followers of the angle detecting mechanisms 422,423, respectively. These angle detecting mechanisms 422, 423 basically detect a shift movement of the positioning means 220 or the door control mechanism 442b.

An operation of shift and lock mechanisms of the record/reproduce unit 206 will be explained below. The control unit 2, connected to the auto player 1, processes a command transmitted from the remote controller 3 and feeds a command to the auto player 1. The auto player 1 selects a disk among numerous disks stored in the tray stockers 104, 105 and performs record/reproduction under the control of the player control unit in accordance with the command supplied from the control unit 2.

The lifter 108 is moved downward by the vertical driving mechanism 212 until it reaches the designated position of the multistage tray stockers 104, 105. The tray extraction mechanism 116 pulls out a pair of right and left trays 114, 114 from the right and left tray stockers 104, 105 and, in turn, transports these trays 114, 114 downward to transfer them onto the record/reproduce unit 206.

Before the lifter 108 completes the tray selecting operation, the slide base 214 of the record/reproduce portion 206 shifts in the lateral direction being guided by the guide rail 217 and the wheel 218. As explained above, the lateral feeding means 219 drives the slide base 214. Furthermore, by the cam function of the lateral feeding means 219, the positioning means 220 moves to its lock position and the slide base 214 is fixed at a predetermined position. Namely, as shown in FIG. 19, the speed-reduction drive source 421 rotates the lateral feeding means 219 in normal and opposite directions, and the partially geared pinion of the lateral feeding means 219 meshes with the rack 419 of the slide base 214.

Accordingly, the slide base 214 slides along the guide rail 217 until it reaches the lateral feed limit. Even if the partially geared pinion is further rotated from this condition, the slide base 214 does not move any more because the meshing engagement between the rack and pinion is no longer established.

Meanwhile, by the function of the cam groove 420 and the cam follower of the lateral feeding means 219, the positioning means 220 moves to its lock position. The positioning means 220 moves until it reaches the position shown in FIG. 20 and engages with the record/reproduce unit 206 at this position so as to lock it.

In this instance, the angle detecting mechanism 422 is moved by the function of its cam follower and the cam groove 422a formed on the lower surface of the lateral feeding means 219. In response to movement of the angle detecting mechanism 422, the motor 421 is stopped and therefore the speed-reduction drive source 421 is deactivated. Thereafter, the disk is transferred from the tray stocker 104 or 105 to the lifter 108 and then the record/reproduction is performed.

Furthermore, if the auto player 1 receives a door unlock command, the lateral feeding means 219 initiates rotating in a right direction under the condition that the recording/reproducing operation of the record/reproduce unit 206 is over and the disk has been returned to the original tray stocker 104 or 105. If the lateral feeding means 219 further rotates, the door control mechanism 442b is displaced by the function of its cam follower and the cam groove 442 in a direction to unlock the lock mechanism 442a of the front door 107.

In this case, the angle detecting mechanism 423 operates to stop the speed-reduction drive source 421. Thereafter, the front door 107 can be opened. Immediately after the front door 107 is opened, the laterally feeding means 219 rotates in an opposite direction so as to place the lock mechanism 442 in the lock position. Then, the drive source 421 is stopped in response to the operation of the angle detecting mechanism 422.

SECOND EMBODIMENT

Next explained will be an auto player in accordance with a second embodiment of the present invention, wherein the exchange of disks is allowed even if recording/reproducing operation is still progressing.

Figure 22:
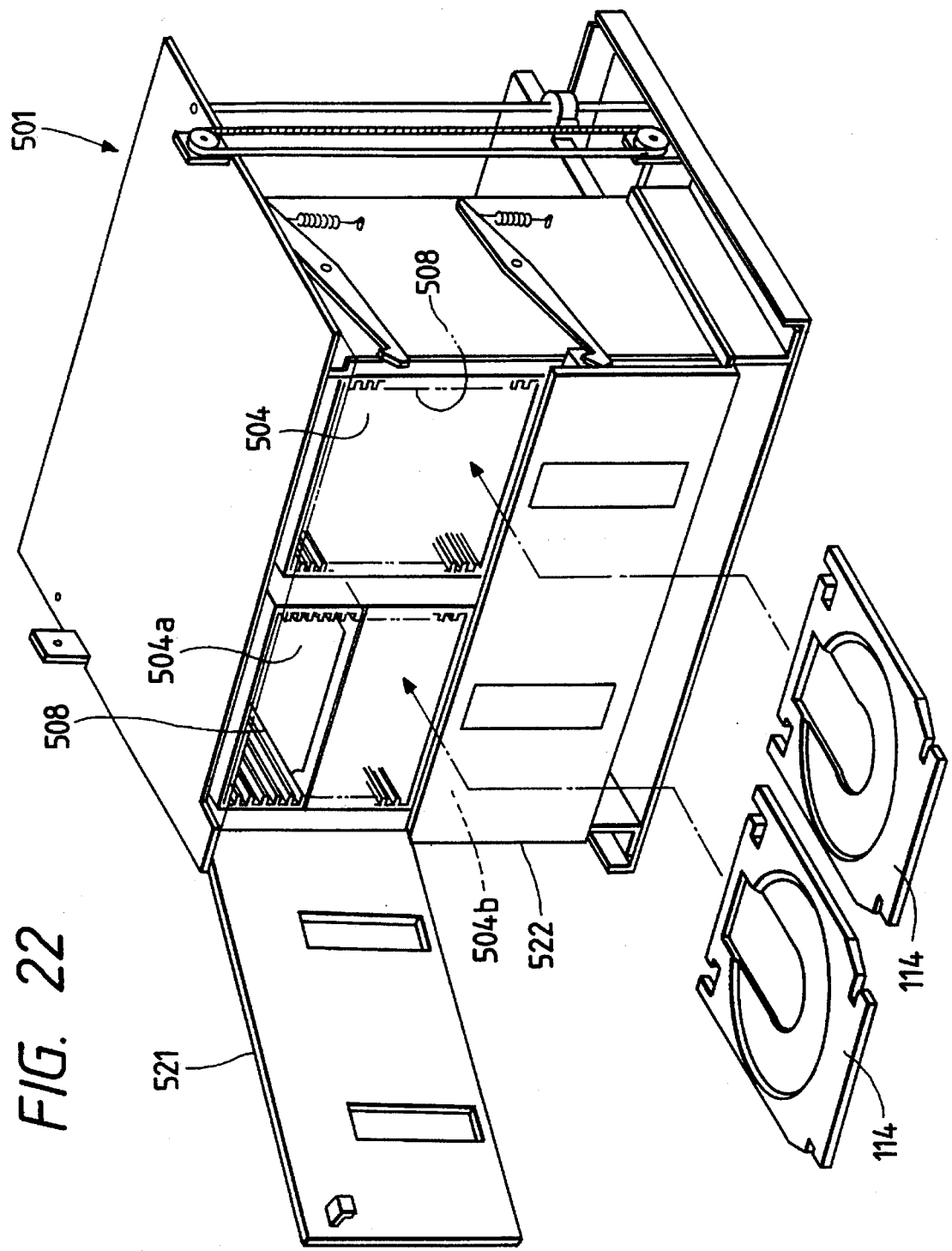
FIG. 22 is a perspective view showing a front side of an auto player as a recording/reproducing apparatus including an auto changer for a disk-like recording medium in accordance with a second embodiment of the present invention.
Figure 23:
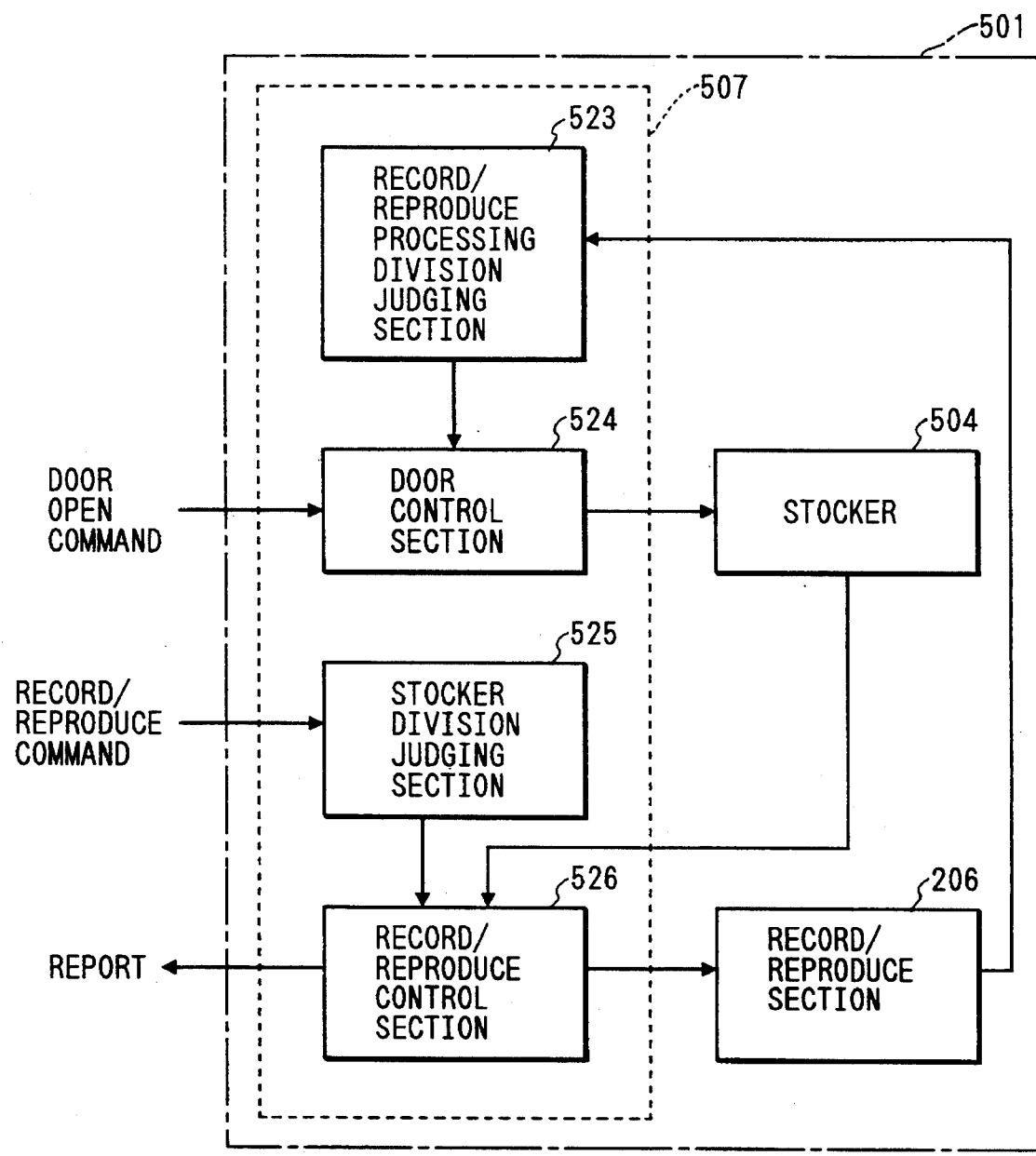
FIG. 23 is a circuit block diagram showing a player controller for the auto player in accordance with the second embodiment of the present invention.

FIG. 22 is a perspective view showing a front side of an auto player 501 as a recording/reproducing apparatus including an auto changer for a disk-like recording medium in accordance with a second embodiment of the present invention. FIG. 23 is a circuit block diagram showing a player controller for the auto player 501 in accordance with the second embodiment of the present invention.

The tray stocker 504 has a front opening 508 for operating disks (i.e. trays 114). The auto player 501 has two front doors 521, 522 arrayed in an up-and-down direction so as to close the front opening 508 of the tray stocker 504. A plurality of tray stockers 504a, 504b are provided so as to correspond to the front doors 521, 522.

In FIG. 23, a player controller 507 of the auto player 501 is operatively connected with the control unit 2 of FIG. 4 so as to receive a door open command and a record/reproduce command from the control unit 2 and to send an operation report to the control unit 2.

The player controller 507 comprises a record/reproduce processing division judging section 523 and a door control section 524. The record/reproduce processing division judging section 523 detects an operational condition of the record/reproduce section 206 and discriminates a division of the tray stocker 504 to which the disk presently being recorded or reproduced belongs. The door control section 524 receives a judging result from the record/reproduce processing division judging section 523 and the door open command supplied from the control unit 2. The door control section 524 performs its control on the basis of above judging result and the door open command, so as to allow a user to open a door other than the door which is related to the tray stocker 504 of the disk being presently recorded or reproduced.

The player controller 507 further comprises a stocker division judging section 525 and a record/reproduce control section 526. The stocker division judging section 525 makes a judgement as to which stocker is related to the disk designated by the record/reproduce command supplied from the control unit 2. The record/reproduce control section 526 generates an operation command to the record/reproduce section 206 in accordance with the open/close condition of the door which is related to the stocker of the designated disk. Or, the record/reproduce control section 526 supplies the control unit 2 with the operation report indicating a disable condition of record/reproduction.

When the door open command is received, the record/reproduce processing division judging section 523 detects an operational condition of the record/reproduce section 206 and discriminates a division of the tray stocker 504 to which the disk presently being recorded or reproduced belongs. On the basis of the judgement result of the record/reproduce processing division judging section 523, the door control section 524 performs the door opening control variously. If the recording/reproducing operation is over, the door control section 524 unlocks all the door 521, 522. If the recording/reproducing operation is progressing, the door control section 524 unlocks either the door 521 or 522 which is not related to the stocker 504a or 504b of the presently recorded or reproduced disk. Accordingly, it becomes possible to exchange disks even if the recording/reproducing operation of other disk is progressing.

Figure 24:
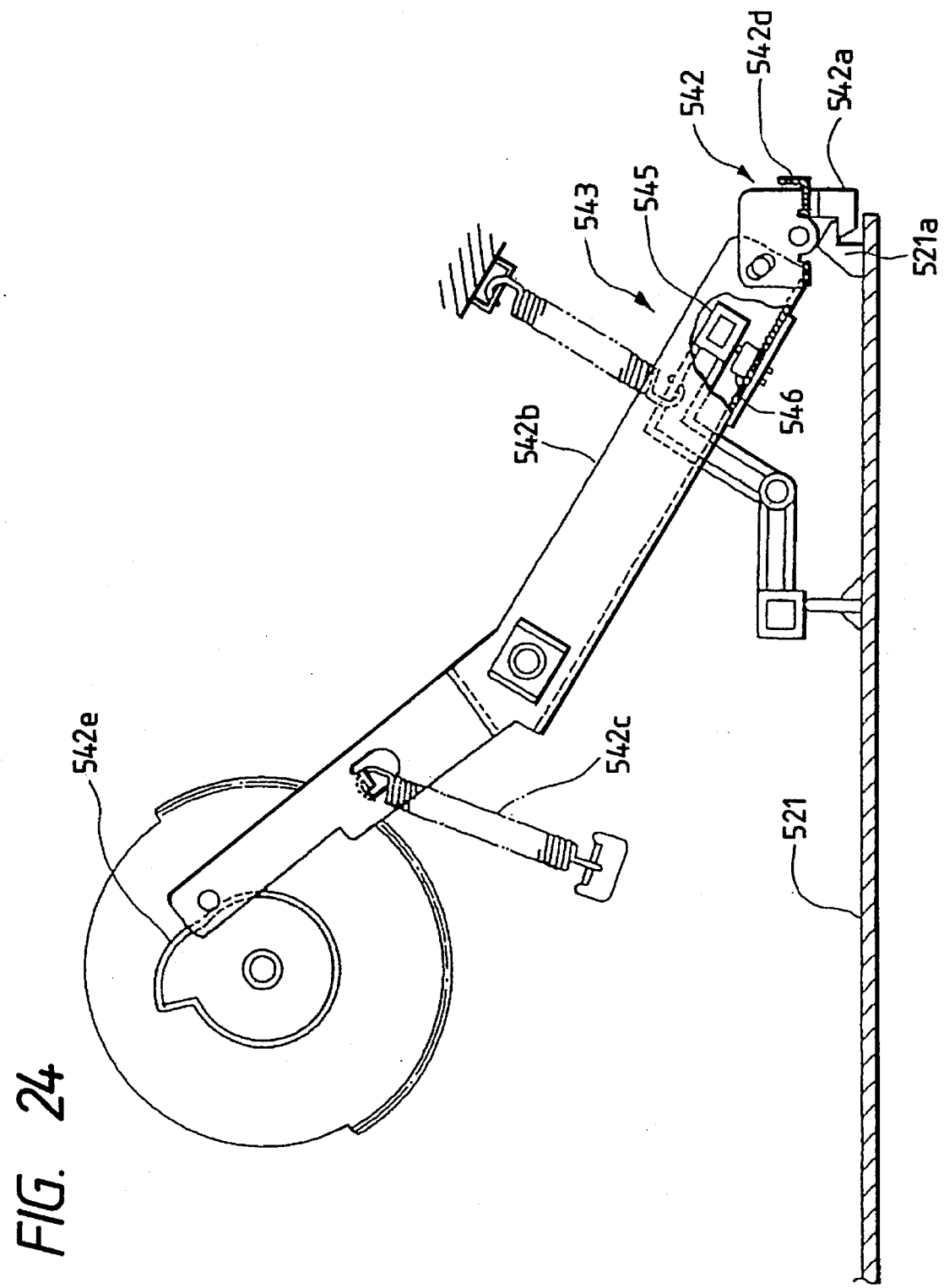
FIG. 24 is a plane view showing a door open/close detecting mechanism of the tray stocker in accordance with the present invention.
Figure 25:
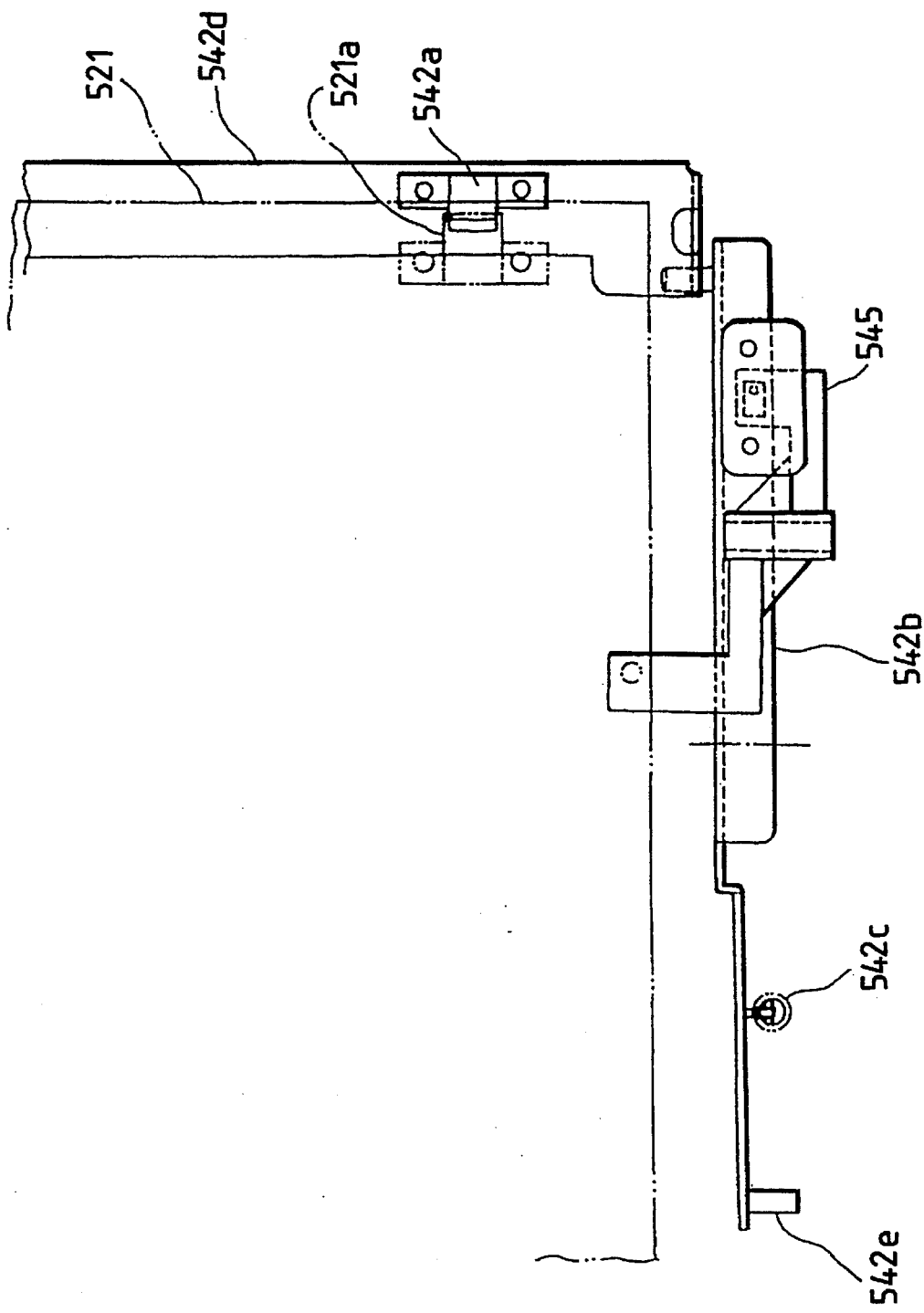
FIG. 25 is a front view showing the door open/close detecting mechanism of the tray stocker in accordance with the present invention.

A door open/close detecting mechanism will be explained below. FIG. 24 is a plane view showing a door open/close detecting mechanism of the tray stocker in accordance with the present invention. FIG. 25 is a front view showing the door open/close detecting mechanism of FIG. 24.

The auto player 501 includes an engaging mechanism 542 and a door open/close detecting means 543. The engaging mechanism 542 engages with the door 521. The door open/close detecting means 543 generates a signal allowing the recording/reproducing operation only when the door 521 is closed.

The engaging mechanism 542 comprises a door engaging portion 542a which is engageable with a hook portion 521a of the door 521, a base portion 542d supporting the door engaging portion 542a and swingably extending downward, an engaging link portion 542b being swingable together with the base portion 542d, and a spring 542c elastically urging ,the engaging link portion 542b so as to maintain the door engaging portion 542a at an engageable position.

The door engaging portion 542a is provided at several portions along the vertically extending base portion 542d, although only one is shown in FIG. 25. The corresponding number of the hook portions 521a are provided on the door 521. The engaging link portion 542b is provided close to a door responsive member 545, so that the door responsive member 545 retreats with respect to the engaging link portion 542b in response to the opening of the door 521.

The engaging link portion 542b is provided with a detecting portion 546 including a limit switch. The detecting portion 546 faces close to the door responsive member 545. A cam mechanism 542e is provided to cause a swing motion of the engaging link portion 542b. The door engaging portion 542a is locked or unlocked in accordance with cam function of the cam mechanism 542e.

Figure 26A:
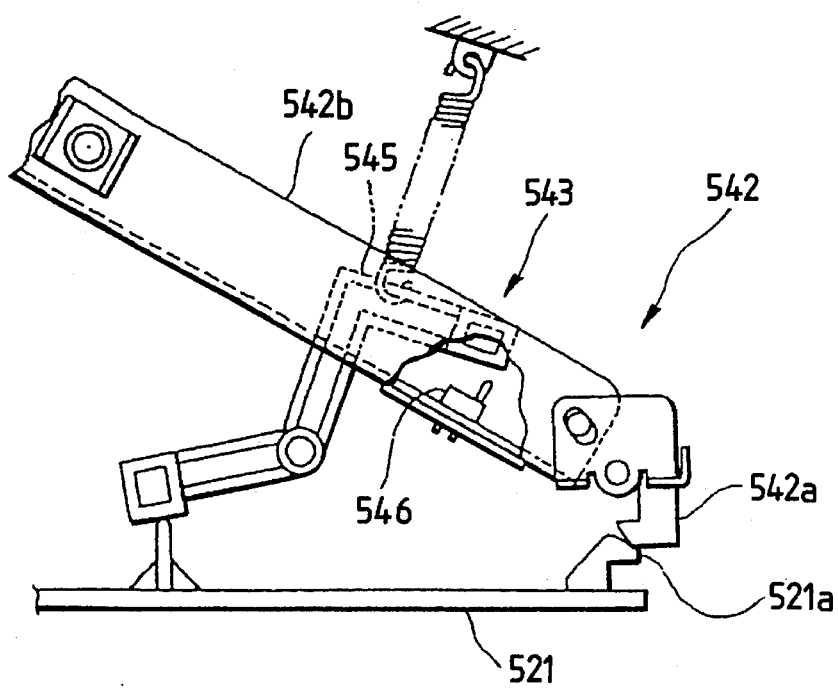
FIGS. 26(A) and 26(B) are views showing an operation of the door open/close detecting mechanism.
Figure 26B:
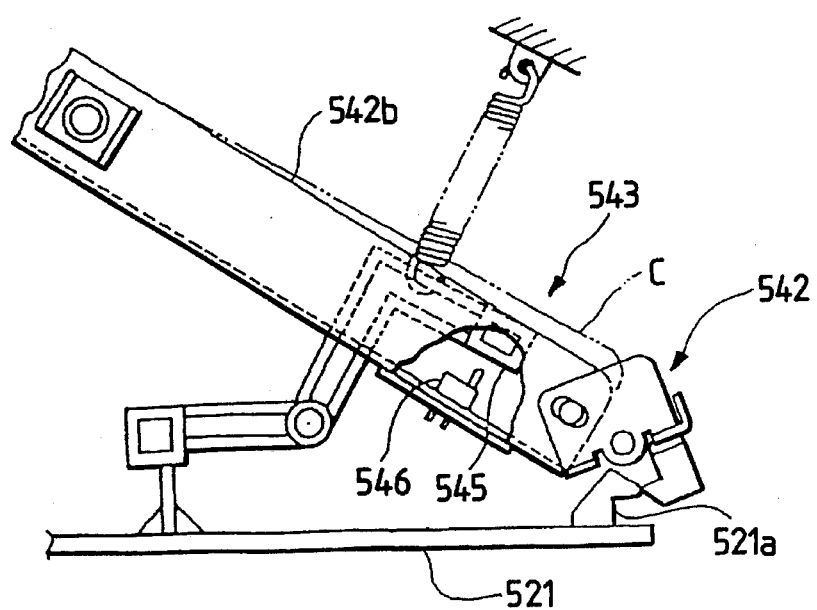

FIGS. 26(A) and 26(B) are views showing an operation of the door open/close detecting mechanism. When the door 521 is closed, the hook portion 521a of the door 521 approaches the door engaging portion 542a of the engaging mechanism 542 as shown in FIG. 26(A). If the door 521 is further depressed as shown in FIG. 26(B), the engaging link portion 542b retreats against the door responsive member 545. If the door 521 is further more depressed, the hook portion 521a of the door 521 is completely engages with the door engaging portion 542a. And, the engaging link portion 542b engages with the door responsive member 545 so that the door responsive member 545 abuts the detecting portion 546. Thus, it becomes possible to detect the closing of the door 521 without highly complicated detector.

In response to the detecting signal of the detecting portion 546, recording/reproducing processing is initiated. As the cam mechanism 542e of FIG. 24 is not operated unless the recording/reproducing operation is over, it becomes possible to firmly lock the door 521 so as not to be opened undesirably.

In other words, the record/reproduce unit 206 is prohibited to perform a recording/reproducing operation of the selected recording medium when the door 521 is opened.

Although the present embodiments explain the compact disk as a recording medium of the present invention, it is needless to say that a magneto-optical disk or other recording medium can be used in the same manner.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A recording/reproducing apparatus including an auto changer for a disk-like recording medium comprising:

a plurality of trays, each structured for accommodating a recording medium;

right and left tray stockers disposed adjacently and in parallel with each other, said right and left tray stockers having multistage guide grooves configured so as to allow a tray accommodating a recording medium to be inserted from a front end thereof and to be extracted from a rear end thereof;

a lifter disposed at said rear end of said right and left tray stockers;

a tray extracting mechanism provided on said lifter associated with a same number of disk clampers as a number of said for extracting two trays from said right and left tray stockers, said tray extracting mechanism including two disk clampers, and a slider slidable in a frontward and rearward direction of said right and left tray stockers, said slider having an engaging means for simultaneously engaging with two trays disposed at a same height in each of said right and left tray stockers when said slider is extended frontwardly toward said right and left tray stockers;

said two disk clampers holding said two trays extracted by said tray extracting mechanism and said lifter transporting said two extracted trays vertically downwardly; and record/reproduce means disposed below said lifter for receiving a selected recording medium from a corresponding one of said two extracted trays for recording/reproducing.

2. A recording/reproducing apparatus in accordance with claim 1, further comprising a shift mechanism for shifting said record/reproduce means in a lateral direction so as to position said record/reproduce means right below the tray transporting the selected recording medium.

3. A recording/reproducing apparatus in accordance with claim 1, further comprising:

a plurality of doors being provided to close said front end of the tray stockers and being opened in response to a door open command;

record/reproduce division judging means for judging a tray stocker division to which said selected recording medium belongs on the basis of opening of said doors; and door control means for locking a door relating to said tray stocker division and unlocking another door.

4. A recording/reproducing apparatus in accordance with claim 1, further comprising:

a door provided to close said front end of the tray stockers;

a door locking member for locking and unlocking said door;

a door linkage mechanism linked with said door locking member so as to depart from a locked position in response to an opening of said door;

detecting means for detecting the opening of said door on the basis of a movement of said door linkage mechanism; and record/reproduce control means for prohibiting said record/reproduce means to perform recording/reproducing of said selected recording medium when said door is opened.

5. A recording/reproducing apparatus in accordance with claim 1, wherein said lifter is associated with a swing arm connected with said lifter through a speed reduction mechanism so as to cause a swing motion in response to a vertical shift motion of said lifter, and said swing arm is urged by a spring against weight of said lifter.

6. A recording/reproducing apparatus in accordance with claim 1, wherein said tray extracting mechanism operates for simultaneously extracting said two trays from said same height in said right and left tray stockers.

7. A recording/reproducing apparatus in accordance with claim 1, wherein said engaging means of the slider comprises symmetrically bifurcated extraction claws.

8. A recording/reproducing apparatus in accordance with claim 7, wherein said slider having said symmetrically bifurcated extraction claws engaging means is slidable along a guide groove formed on the lifter in the frontward and rearward direction of said right and left tray stockers.

9. A recording/reproducing apparatus in accordance with claim 7, wherein said symmetrically bifurcated claws are engaged with recessed portions of the trays.

10. A recording/reproducing apparatus in accordance with claim 7, wherein said symmetrically bifurcated claws comprise L-shaped and reverse L-shaped claws.

11. An auto player comprising:

right and left tray stockers disposed adjacently and in parallel with each other, said right and left tray stockers having multistage guide grooves for storing a plurality of recording mediums;

said multistage guide grooves configured so as to allow a tray accommodating a recording medium to be inserted from a front end thereof and to be extracted from a rear end thereof;

a lifter disposed at said rear end of said right and left tray stockers for transporting a recording medium in a vertical direction;

a tray extracting mechanism provided on said lifter for extracting two trays from said right and left tray stockers, said tray extracting mechanism including two disk clampers, and a slider slidable in a frontward and rearward direction of said right and left tray stockers, said slider having an engaging means for simultaneously engaging with two trays disposed at a same height in each of said right and left tray stockers when said slider is extended frontwardly toward said right and left tray stockers;

record/reproduce means disposed below said lifter and shiftable to a position right below a selected recording medium for receiving and placing the selected recording medium in position for recording/reproducing;

a shift mechanism defined by a rack and a partially geared pinion for shifting said record/reproduce means, said rack being formed on said record/reproduce means, said partially geared pinion being formed thereon with a geared portion, said geared portion meshing with said rack so as to drive said rack in response to a rotation of said partially geared pinion, and a non-geared portion, said non-geared portion disengaging said rack from said partially geared pinion; and a lock mechanism integrally shifting together with said partially geared pinion, said lock mechanism engaging with said record/reproduce means when said rack is disengaged from said partially geared pinion.

12. An auto player in accordance with claim 11, wherein said engaging means of the slider comprises symmetrically bifurcated extraction claws.

13. An auto player in accordance with claim 12, wherein said slider having said symmetrically bifurcated extraction claws engaging means is slidable along a guide groove formed on the lifter in the frontward and rearward direction of said right and left tray stockers.

14. An auto player in accordance with claim 12, wherein said symmetrically bifurcated claws are engaged with recessed portions of the trays.

15. An auto player in accordance with claim 12, wherein said symmetrically bifurcated claws comprise L-shaped and reverse L-shaped claws.

16. A recording/reproducing apparatus including an auto changer for a disk-like recording medium comprising:

a plurality of trays, each structured for accommodating a recording medium;

right and left tray stockers disposed adjacently and in parallel with each other, having multistage guide grooves storing said plurality of trays, said guide grooves being configured so as to allow a tray accommodating a recording medium to be inserted from a front end thereof and to be extracted from a rear end thereof;

a lifter disposed at said rear end of said right and left tray stockers;

a gate provided at the rear end of said right and left tray stockers so as to be displacable between an open position and a closed position, said gate preventing said tray from being extracted out of said right and left tray stockers toward said lifter when said gate is in said closed position and allowing said tray to be extracted toward said lifter when said gate is in said open position;

a lock member linked with said gate to lock said lifter when said gate is opened;

a tray extracting mechanism provided on said lifter for extracting a plurality of trays from said right and left tray stockers, said tray extracting mechanism including a plurality of disk clampers, and a slider slidable in a frontward and rearward direction of said right and left tray stockers, said slider having an engaging means for simultaneously engaging with plural trays disposed at a same height in each of said right and left tray stockers when said slider is extended frontwardly toward said right and left tray stockers;

said plurality of disk clampers holding said plurality of trays extracted by said tray extracting mechanism and said lifter transporting said plurality of trays vertically downwardly; and record/reproduce means disposed below said lifter for receiving a selected recording medium from a corresponding one of said plurality of extracted trays for recording/reproducing.

17. A recording/reproducing apparatus in accordance with claim 16, wherein said engaging means of the slider comprises symmetrically bifurcated extraction claws.

18. A recording/reproducing apparatus in accordance with claim 17, wherein said slider having said symmetrically bifurcated extraction claws engaging means is slidable along a guide groove formed on the lifter in the frontward and rearward direction of said right and left tray stockers.

19. A recording/reproducing apparatus in accordance with claim 17, wherein said symmetrically bifurcated claws are engaged with recessed portions of the trays.

20. A recording/reproducing apparatus in accordance with claim 17, wherein said symmetrically bifurcated claws comprise L-shaped and reverse L-shaped claws.

* * * * *